United States Patent
Yasui

(10) Patent No.: US 7,151,636 B2
(45) Date of Patent: Dec. 19, 2006

(54) OPTICAL SYSTEM

(75) Inventor: Hiroto Yasui, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 33 days.

(21) Appl. No.: 11/114,751

(22) Filed: Apr. 25, 2005

(65) Prior Publication Data

US 2005/0243436 A1 Nov. 3, 2005

(30) Foreign Application Priority Data

Apr. 28, 2004 (JP) .............................. 2004-134577

(51) Int. Cl.
*G02B 15/14* (2006.01)
(52) U.S. Cl. ...................................... 359/680; 359/642
(58) Field of Classification Search ................ 359/680, 359/681, 682, 642
See application file for complete search history.

(56) References Cited

U.S. PATENT DOCUMENTS

| 4,913,535 | A | 4/1990 | Robb |
| 5,923,479 | A | 7/1999 | Nagata |
| 5,978,158 | A | 11/1999 | Nagata |
| 6,404,561 | B1 | 6/2002 | Isono et al. |
| 7,057,831 | B1 * | 6/2006 | Ogawa ........................ 359/795 |

FOREIGN PATENT DOCUMENTS

| JP | 10-115777 | 5/1998 |
| JP | 11-064726 | 3/1999 |
| JP | 2000-267005 | 9/2000 |
| JP | 2001-194590 | 7/2001 |

* cited by examiner

*Primary Examiner*—Scott J. Sugarman
(74) *Attorney, Agent, or Firm*—Morgan & Finnegan, LLP

(57) ABSTRACT

Among a plurality of lens units constituting an optical system, at least one of the plurality of lens units includes a refractive optical element made of a solid material that satisfies the following conditions:

$3 < \nu d < 30$ $0.10 < \theta gd < 1.25$ $0.10 < \theta gF < 0.60$ where $\nu d$ is an Abbe number of the solid material and $\theta gd$ and $\theta gF$ represent partial dispersion ratios of the solid material. The refractive optical element made of the solid material has refractive power with a sign opposite to a sign of refractive power of the lens unit including the refractive optical element.

9 Claims, 15 Drawing Sheets

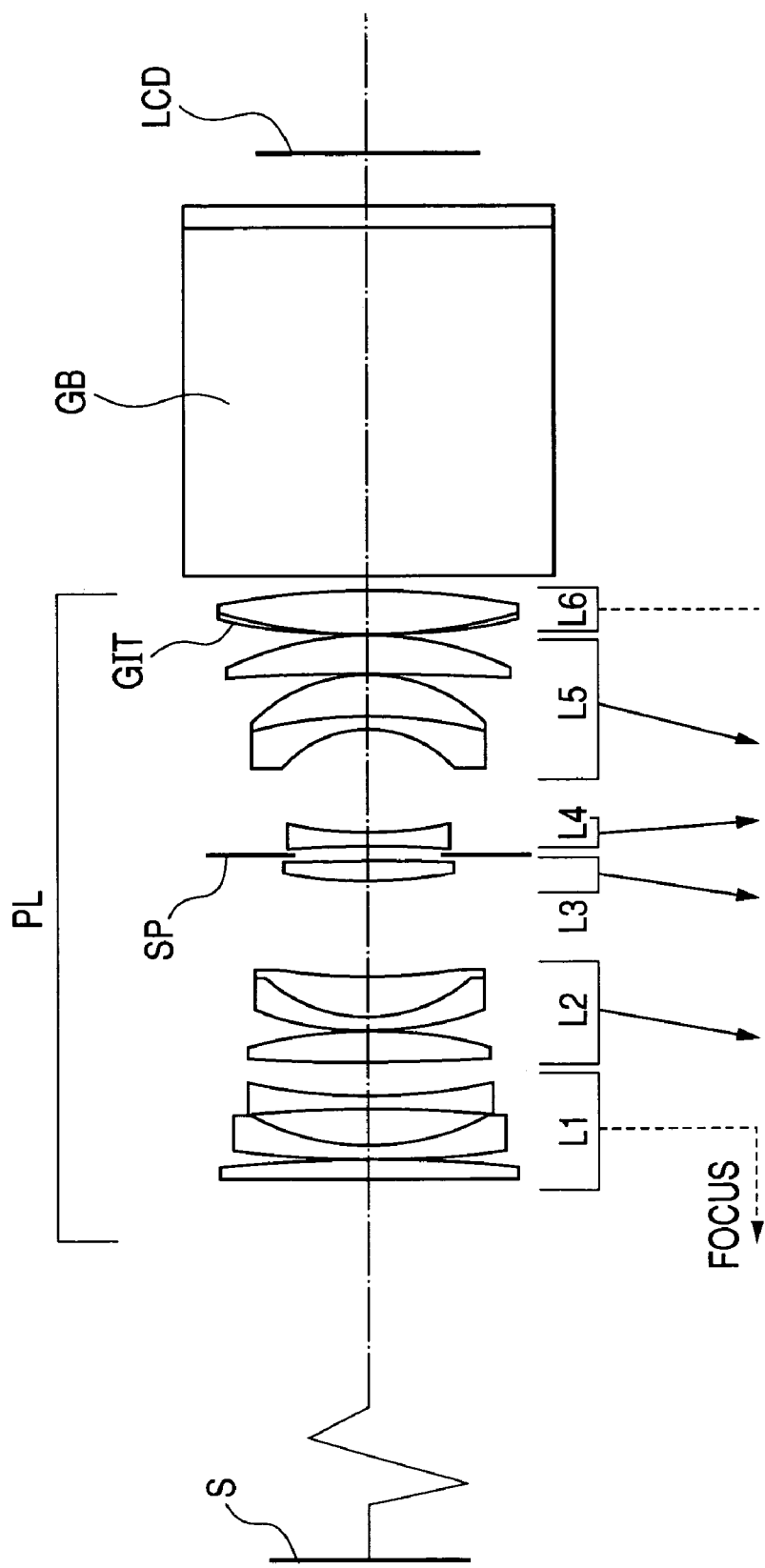

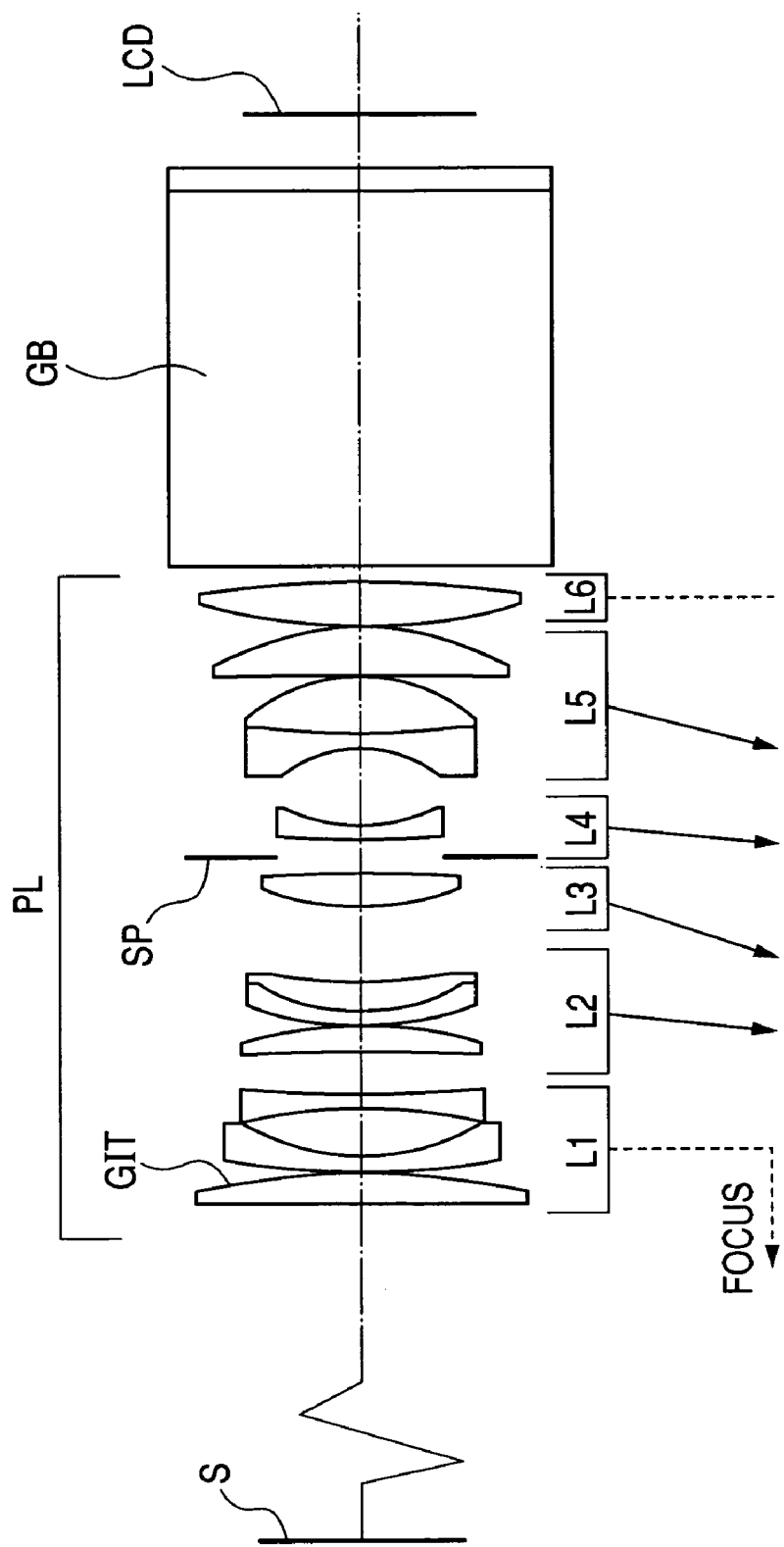

OPTICAL SYSTEM

BACKGROUND OF THE INVENTION

1. Field of the Invention

The present invention relates to an optical system that uses an optical material having extraordinary partial dispersion and is suitable for, for instance, a photographing optical system of a silver-halide film camera, a video camera, a digital still camera, or the like or a projection optical system of a liquid crystal projector or the like.

2. Related Background Art

It is required that a digital optical device, such as a digital camera, have a higher pixel density and provide higher image quality and that an optical system used therein have higher optical performance.

In general, an optical system for image pickup or projection has a tendency that as its lens entire length is reduced, chromatic aberrations, such as an axial chromatic aberration (longitudinal chromatic aberration) and a chromatic aberration of magnification (lateral chromatic aberration), out of various aberrations are increased and optical performance is lowered. As a method for suppressing the occurrence of such chromatic aberrations, an optical system where achromatization has been achieved using an extraordinary partial dispersion material Japanese Patent Application Laid-open No. 2000-267005 and Japanese Patent Application Laid-open No. 2001-194590 (corresponding to U.S. Pat. No. 6,404,561 B) and an optical system where achromatization has been achieved using a diffractive optical element having a diffractive action (Japanese Patent Application Laid-open No. H10-115777 (corresponding to U.S. Pat. No. 5,978,158 B) and Japanese Patent Application Laid-open No. H11-064726 (corresponding to U.S. Pat. No. 5,923,479 B) are generally well known.

Among those optical systems, the optical system where correction of chromatic aberrations is performed using the diffractive optical element utilizes a physical phenomenon where an output manner of the chromatic aberrations with respect to a light beam having a certain reference wavelength at a refractive surface in the optical system becomes opposite to that at a diffractive surface. This means that although ordinary optical glass has a positive dispersion characteristic, the diffractive optical element has a negative dispersion characteristic ($vd=-3.453$). In addition, the diffractive optical element has a strong extraordinary dispersibility ($\theta gF=0.2956$) and also has a characteristic where it is also possible to have an aspherical function by changing the periodical structure of the diffractive optical element. From above, the diffractive optical element is capable of achieving two profound effects that are a chromatic aberration correction effect and an aspherical effect utilizing the negative dispersion characteristic and the strong extraordinary dispersibility. Thus it can be expected that the optical performance will be significantly improved with the diffractive optical element. In addition, since the diffractive optical element is small in size, it is possible to extremely reduce its spatial occupancy, so that the optical system has features that it is easy to achieve weight reduction and miniaturization thereof.

Also, it is known that a liquid material that exhibits a relatively high dispersion and relatively extraordinary partial dispersion characteristics has a chromatic aberration correction action similar to that of the diffractive optical element and an achromatic optical system using the liquid material is proposed (U.S. Pat. No. 4,913,535 B).

In general, when correcting the chromatic aberrations of the optical system by means of the extraordinary partial dispersion material, this results in a tendency that the number of lenses of the optical system is increased and the entire optical length (distance from the first lens surface to an image plane) is increased. Also, there is another problem that extraordinary partial dispersion glass, such as fluorite, is very expensive and has a relatively large specific gravity as compared with another low dispersion glass that does not have extraordinary partial dispersion, which leads to an increase of the entire weight of the lens system (for instance, the specific gravities of fluorite and FK01 are respectively 3.18 and 3.63 but the specific gravities of FK5 and BK7 with small extraordinary partial dispersibilities are respectively 2.46 and 2.52). Further, there is still another problem that the surfaces of the extraordinary partial dispersion glass are relatively easy to be damaged and FK01 or the like is easily cracked in response to a sharp temperature change when the diameter of aperture is increased.

On the other hand, the diffractive optical element has a sufficient chromatic aberration correction action but has a problem that diffracted light with unnecessary diffraction-order light other than diffracted light with a design diffraction-order that is actually used becomes chromatic flare light and deteriorates imaging performance. A system is also known in which the unnecessary diffracted light is greatly reduced by concentrating energy to the design diffraction-order light by means of a so-called lamination-type diffraction grating where multiple blazed diffraction gratings have been laminated in an optical axis direction, but there still remains a problem that when photographing a highly bright object, diffraction flare appears.

Also, as a method of manufacturing the diffractive optical element, a method is known with which an ultraviolet curing resin or the like is molding using a die. Since the diffraction efficiency of the diffraction optical element is extremely sensitive to the manufacturing accuracy thereof, extremely high die accuracy and molding accuracy are required so that there is a problem that manufacturing cost of the diffractive optical element is high.

The material disclosed in U.S. Pat. No. 4,913,535 B is liquid, so a structure for sealing it is required and it is impossible to say that manufacturing is easy. Also, there is another problem that characteristics, such as a refractive index and a dispersion characteristic, depend on temperature and it is not necessarily possible to say that environmental resistance is sufficient. Further, the Abbe number is relatively large, the extraordinary partial dispersibility is relatively small, and it is impossible to obtain an interface with the air, so it is difficult to obtain a sufficient chromatic aberration correction action.

SUMMARY OF THE INVENTION

The present invention has been made in light of the conventional examples and has an object to provide an optical system that favorably corrects chromatic aberrations, is easy to manufacture, and excels in environmental resistance.

An exemplified optical system according to the present invention includes a plurality of lens units. At least one of the plurality of lens units includes a refractive optical element made of a solid material that satisfies the following conditions:

$$3 < vd < 30 \qquad (1),$$

$$0.10 < \theta gd < 1.25 \qquad (2),$$

$$0.10 < \theta gF < 0.60 \qquad (3),$$

where νd is an Abbe number of the solid material and θgd and θgF are the respective partial dispersion ratios of the solid material. The refractive optical element made of a solid material has refractive power with a sign opposite to a sign of refractive power of the lens unit including the refractive optical element.

It should be noted here that in the present invention, the definitions of the Abbe number νd and the partial dispersion ratios θgd and θgF are the same as those generally used and when refractive indices with respect to g-line, F-line, d-line, and C-line are respectively referred to as "ng", "nF", "nd", and "nC", they are respectively expressed by the following expressions.

$$\nu d = (nd-1)/(nF-nC)$$

$$\theta gd = (ng-nd)/(nF-nC)$$

$$\theta gF = (ng-nF)/(nF-nC)$$

Also, in the present invention, the solid material refers to a material that is solid under a state where the optical system is used, not meaning that the state of the solid material before the use of the optical system such as at the time of manufacturing. For instance, a material that is a liquid material at the time of manufacturing but becomes a solid material through curing corresponds to the solid material in the present invention.

BRIEF DESCRIPTION OF THE DRAWINGS

FIG. 1 is a lens cross-sectional view of an optical system in a first embodiment;

FIG. 3 is a lens cross-sectional view of an optical system in a second embodiment;

DESCRIPTION OF THE PREFERRED EMBODIMENTS

Figure 2A:
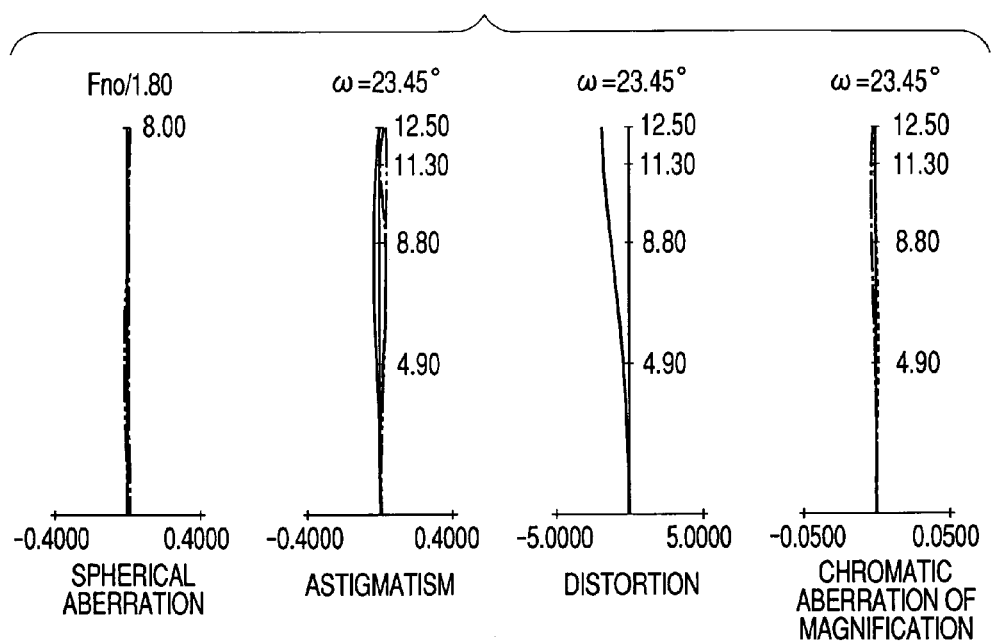
FIGS. 2A and 2B are aberration diagrams of the optical system in the first embodiment.

Prior to describing embodiments of the optical system according to the present invention, an action that a high dispersion optical material exerts on correction of aberrations of the optical system will be first described.

Letting $\Delta\Psi$ be the refractive power change of a surface of a refractive lens, ν be the Abbe number, and h and H be the heights of passage of a paraxial marginal ray and a paraxial chief ray through a lens surface from the optical axis, respectively, it is possible to express a change $\Delta L$ of an axial chromatic aberration coefficient and a change $\Delta T$ of a magnification chromatic aberration coefficient at the lens surface as follows.

$$\Delta L = h^2 \cdot \Delta\psi/\nu \qquad (a)$$

$$\Delta T = h \cdot H \cdot \Delta\psi/\nu \qquad (b)$$

It should be noted here that the paraxial marginal ray means a paraxial ray that is made incident in parallel with the optical axis of the optical system while setting the height from the optical axis as "1" when the focal length of the entire system of the optical system is normalized to "1". Also, the paraxial chief ray is a paraxial ray that passes through an intersection of the incident pupil of the optical system and the optical axis among the light beams that are incident at −45° with respect to the optical axis when the focal length of the entire system of the optical system is normalized to "1". The sign of the incident angle of the optical system in defined as a clockwise direction with respect to the optical axis being positive and a counterclockwise direction with respect to the optical axis being negative. Note that it is assumed that an object exists on the left side of the optical system and a light beam incident on the optical system from an object side travels from the left to the right.

As is apparent from Expressions (a) and (b), each of the aberration coefficient changes $\Delta L$ and $\Delta T$ with respect to a refractive power change $\Delta\psi$ of the lens surface is increased as the absolute value of the Abbe number ν is decreased (that is, dispersion is increased). Accordingly, when a high dispersion material, whose absolute value of the Abbe number ν is small, is used, this results in a situation where the refractive power change amount $\Delta\psi$ to obtain a required chromatic aberration is reduced. This means that it becomes possible to control the chromatic aberrations without exerting significant influences on various aberrations such as a spherical aberration, a comma aberration, and astigmatism and independency of the chromatic aberration correction is enhanced.

Conversely, when a low dispersion material is used, the refractive power change amount $\Delta\psi$ to obtain the required chromatic aberration is increased, which results in a situation where various aberrations, such as a spherical aberration, greatly change and the independency of the chromatic aberration correction is weakened. Accordingly, it is important in terms of aberration correction that the lens surface of at least one of the lenses constituting the optical system is a refractive lens surface made of a high dispersion material.

Next, on the basis of high dispersion, an action that an optical material having a low partial dispersion ratio exerts on the correction of the aberrations of the optical system will be described.

As is well known, in the wavelength dependence characteristic (dispersion characteristic) of the refractive index of the optical material, the Abbe number represents the entire inclination of a dispersion characteristic curve and the partial dispersion ratio expresses the curving manner of the dispersion characteristic curve.

In the case of a general optical material, the refractive index on a short wavelength side is greater than the refractive index on a long wavelength side (Abbe number is a positive value), the dispersion characteristic curve draws a downwardly convex shape (partial dispersion ratio is a positive value), and a refractive index change with respect to a wavelength change is increased as the wavelength is shortened. Also, there is a tendency that as the Abbe number of the high dispersion optical material is reduced, the partial dispersion ratio is increased and the downwardly convex degree of the dispersion characteristic curve is increased.

In the case of an optical material having a high partial dispersion ratio, the wavelength dependence characteristic curve of the chromatic aberration coefficient of the lens surface exhibits a larger curve on the short wavelength side as compared with a case where an optical material having a low partial dispersion ratio is used. In this case, when the refractive power of the lens surface is changed in order to control the chromatic aberrations, the entire inclination of the chromatic aberration coefficient wavelength characteristic curve changes about the position of a design reference wavelength. As to this change, in the case of the material whose partial dispersion ratio is high, as compared with the case of the material whose partial dispersion ratio is low, a movement on the short wavelength side becomes particularly large and the entire inclination changes while greatly changing a curving amount. Therefore, even when the glass material in other portions in the refractive system is changed, it becomes difficult to obtain a construction where cancellation is made by both of the entire inclination and the curve in the chromatic aberration coefficient wavelength dependence characteristic curve and it becomes impossible to correct the chromatic aberrations in the entire wavelength range.

This will be described in detail by taking, as an example, achromatization in an optical system composed of a refractive optical system portion GIT using a high dispersion material and another refractive optical system portion G.

In achromatization using a high dispersion optical material, chromatic aberrations in the entire system are obtained by canceling relatively large chromatic aberration coefficients between the portion GIT and the portion G. Therefore, first, from a state where chromatic aberrations in the portion G that is a partial system have been corrected to some extent, a positive lens constituting the portion G is selected on a relatively high dispersion side and a negative lens is selected on a relatively low dispersion side. As a result, the entire inclination of the chromatic aberration coefficient wavelength dependence characteristic curve in the portion G changes while increasing linearity in comparison with its original state.

By giving appropriate refractive power to the portion GIT under this state, the entire inclination of the chromatic aberration wavelength dependence characteristic curve of the portion G is canceled. However, when the portion GIT is made of an optical material whose partial dispersion ratio is high, since the portion GIT has a large curve in a direction opposite to the curve of the aberration coefficient wavelength dependence characteristic curve of the portion G, even when it is possible to cancel the entire inclination component, it is impossible to cancel the curve component.

In contrast to this, when the portion GIT is made of an optical material whose partial dispersion ratio is small, since the chromatic aberration coefficient wavelength dependence characteristic curve of the portion GIT exhibits a relatively linear property, even when the refractive power is changed in order to control the chromatic aberrations, it is possible to change the inclination about the position of the design wavelength while maintaining the relatively linear property. Accordingly, with the portion GIT and the portion G, it becomes possible to simultaneously cancel the inclination component and the curve component of the chromatic aberration coefficient wavelength dependence characteristic curve with relative ease.

That is, it is important that the portion GIT is made of an optical material that has high dispersibility and a small partial dispersion ratio and the following conditional expressions (1), (2), and (3) specified in each embodiment of the present invention express a relation between the Abbe number and the partial dispersion ratio for favorably correcting the chromatic aberrations based on the principles described above.

For the reasons described above, numerical value ranges of the conditional expressions (1) to (3) are set as follows, $$3 < \nu d < 30 \tag{1},$$

$$0.10 < \theta gd < 1.25 \tag{2},$$

$$0.10 < \theta gF < 0.60 \tag{3},$$

where νd is the Abbe number of the refractive optical system portion (lens or layer) GIT and is expressed by the following expression, $$\nu d = (nd-1)/(nF-nC),$$

where nd, nF, and nC represent refractive indices with respect to d-line, F-line, and C-line, respectively. And, θgd, and θgF are the partial dispersion ratios of the refractive optical system portion (lens or layer) GIT and are respectively expressed by the following expressions, $$\theta gd = (ng-nd)/(nF-nC),$$

$$\theta gF = (ng-nF)/(nF-nC),$$

where ng, nF, nd, and nC represent the refractive indices with respect to g-line, F-line, d-line, and C-line, respectively.

If the Abbe number θd is less than the lower limit value of the conditional expression (1), it is necessary to increase the mixture ratio of inorganic fine particles of ITO to be described later or the like in the refractive optical system portion GIT and there may arise various influences where, for instance, the transmittance of the lens system is lowered. In addition, an extraordinary dispersion effect becomes too strong and the chromatic aberration is excessively corrected, which is not preferable. On the other hand, if the Abbe number θd is greater than the upper limit value, the chromatic aberration correction effect becomes insufficient, which is also not preferable.

When the partial dispersion ratio, is less than the lower limit value of the conditional expression (2) and the lower limit value of the conditional expression (3), like in the case of the conditional expression (1), it becomes necessary to increase the mixture ratio of the inorganic fine particles and the transmittance of the lens system is lowered. In addition, the extraordinary dispersion effect becomes too strong and the chromatic aberration is excessively corrected, which is not preferable. On the other hand, when the partial dispersion ratio is greater than the upper limit value of the conditional expression (2) and the upper limit value of the conditional expression (3), the chromatic aberration correction effect becomes insufficient, which is also not preferable.

From above, when any of the conditional expressions (1) to (3) given above are not satisfied, it become difficult to favorably correct chromatic aberrations, which is not preferable.

It should be noted here that when the numerical value ranges of the conditional expressions (1) to (3) described above are changed to ranges given below, the independency of the chromatic aberration correction is further enhanced and favorable optical performance is obtained.

$$5 < vd < 20 \tag{1a}$$

$$0.50 < \theta gd < 1.00 \tag{2a}$$

$$0.20 < \theta gF < 0.50 \tag{3a}$$

Also, as an example of a solid optical material satisfying the conditional expressions (1) to (3) given above, it is possible to cite a mixture where inorganic oxide fine particles are dispersed in a synthetic resin. In other words, $TiO_2$ (nd=2.2652, vd=11.8), $Nb_2O_5$ (nd=2.367, vd=14.0), ITO (nd=1.8581, vd=5.53), $Cr_2O_3$ (nd=2.2178, vd=13.4), $BaTiO_3$ (nd=2.4362, vd=11.3), and the like can be given.

Figure 15A:
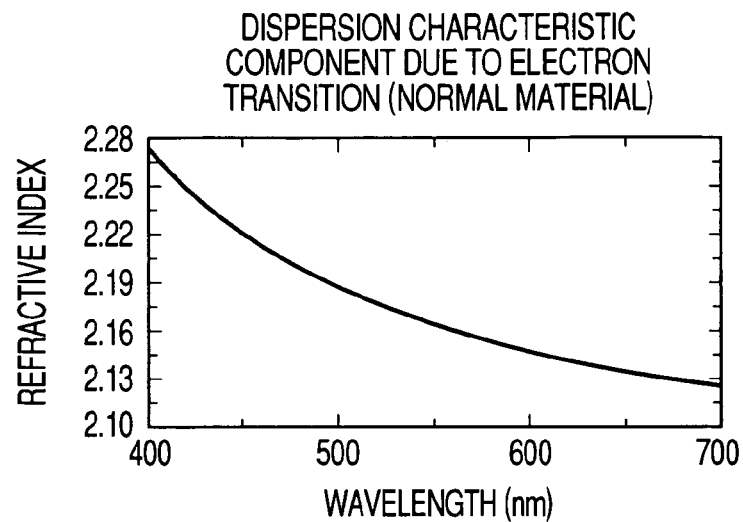
FIG. 15A illustrates a dispersion characteristic component due to electron transition of an optical material (ITO) according to the present invention.
Figure 15B:
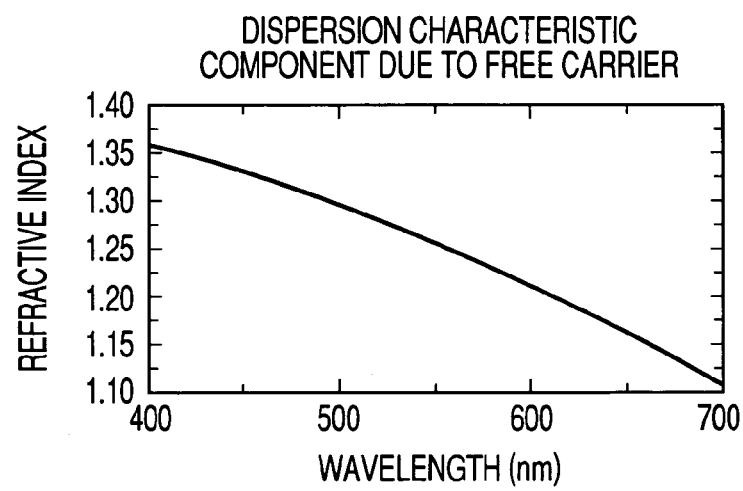
FIG. 15B illustrates a dispersion characteristic component due to free carrier of the optical material (ITO) according to the present invention.
Figure 15C:
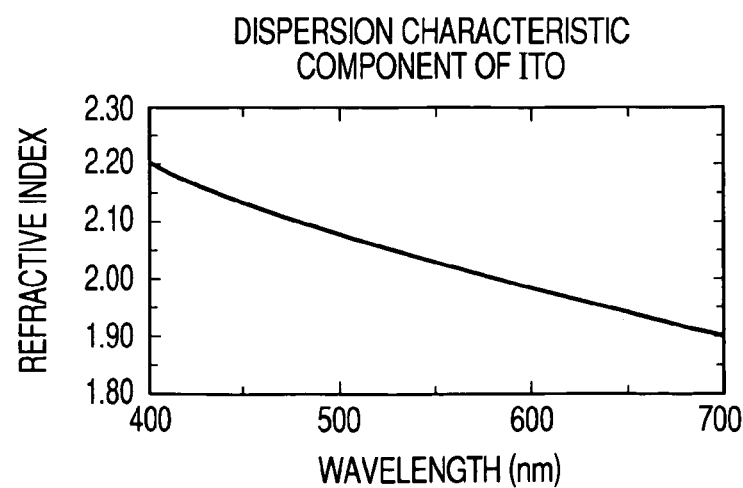
FIG. 15C illustrates a dispersion characteristic component of the optical material (ITO) according to the present invention.

Among various oxides, ITO (Indium-Tin Oxide) is preferable because it exhibits a particularly small Abbe number as compared with the other substances. As is different from ordinary substances, in the case of ITO, free carrier due to conductivity exerts an influence on the refractive index. The dispersion characteristic of ITO (FIG. 15C) is formed by addition of refractive index dispersion (FIG. 15B) in an infrared range due to free carrier to a refractive index change (FIG. 15A) in a short wavelength range due to ordinary electron transition. As a result, the dispersion characteristic of ITO exhibits a dispersion characteristic wavelength dependency that has an extraordinarily large inclination where the Abbe number is 5.53.

Also, the refractive index dispersion (FIG. 15A) due to electron transition sharply changes on the short wavelength side in a visible light range. In contrast to this, the refractive index dispersion (FIG. 15B) due to free carrier sharply changes on the long wavelength side in the visible light range. Through combination of these two influences, the partial dispersion ratio becomes small as compared with ordinary cases.

It should be noted here that as candidates of a material which is transparent and in which an influence of free carrier is expected, it is also possible to cite $SnO_2$, ATO ($SnO_2$ doped with antimony), ZnO, and the like.

ITO is known as a material used to produce a transparent electrode and is ordinarily used for a liquid crystal display element, an EL (electroluminescent) element, and the like. Aside from this, ITO is also used for an infrared ray shielding element and an ultraviolet ray shielding element. In the conventionally known use of ITO, a thickness is limited to a range of 50 to 500 nm and there is no example where ITO is used for correction of chromatic aberrations of an optical system as a mixture of fine particles.

With consideration of an influence of scattering and the like, it is preferable that the average diameter of the ITO fine particles be around 2 nm to 50 nm. In addition, it is also possible to add a dispersant or the like in order to suppress aggregation.

A preferable medium material for dispersion of ITO is a monomer and it is possible to obtain high mass-productivity through photopolymerization molding or thermopolymerization molding using a molding die or the like.

Also, with regard to the optical characteristic of the monomer, it is preferable to use a monomer whose Abbe number is relatively small, a monomer whose partial dispersion ratio is relatively small, or a monomer satisfying the both. Examples thereof are N-polyvinyl carbazole, styrene, polymethylmethacrylate (acrylic), and the like. In embodiments to be described later, acrylic is used as the medium material for the dispersion of the ITO fine particles, however the present invention is not limited to this.

It is possible to easily calculate the dispersion characteristic N (λ) of the mixture, in which the nano fine particles are dispersed, using the following expression derived from well known Drude Equation, $$N(\lambda) = [1 + V\{N_{ITO}^2(\lambda) - 1\} + (1-V)\{N_p^2(\lambda) - 1\}]^{1/2} \tag{c}$$

where λ is an arbitrary wavelength, $N_{ITO}$ is the refractive index of the fine particles of ITO or the like, $N_p$ is the refractive index of the polymer, and V is a ratio of the total volume of the fine particles to the volume of the polymer.

In the embodiment mode of the present invention, a construction is proposed in which a material satisfying the conditional expressions (1) to (3) is used for a lens in an optical system or a layer provided for a surface of the lens. With this construction, by setting a refractive surface made of the material as an aspheric surface, it becomes possible to correct chromatic aberration flare such as chromatic spherical aberration. Also, a construction is preferable in which an interface of the material and an atmosphere, such as the air, is formed, or an interface of the material and a material having a relatively low refractive index is formed because it becomes possible to change the chromatic aberrations relatively greatly through a slight change of the curvature of the interface.

The conditions that the optical material forming the refractive optical system portion GIT should satisfy have been described above. Next, conditions will be described which should be given to the refractive optical system portion GIT that is necessary to correct the chromatic aberrations of a positive-lead (P-lead)-type optical system where lens units are arranged in order from an object side to an image side with a lens unit having positive refractive power being arranged first.

Figure 13:
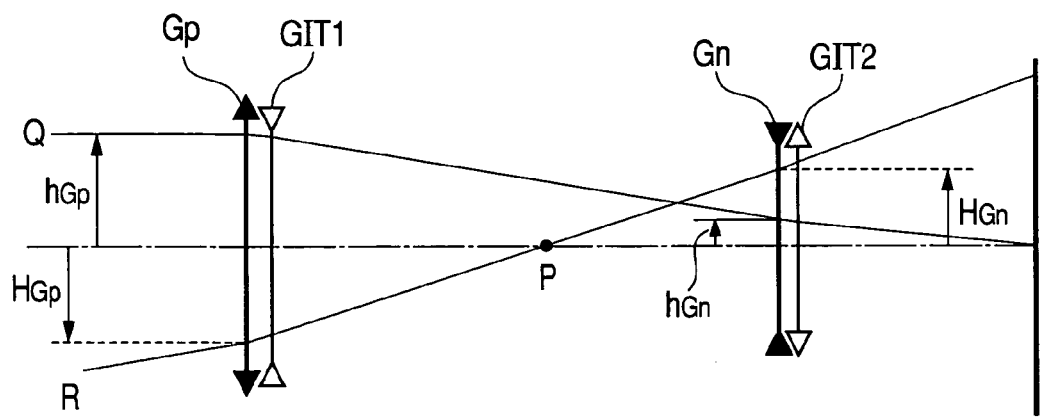
FIG. 13 is a schematic diagram for illustration of a feature of the dispersion characteristic of ITO.

FIG. 13 is a paraxial arrangement schematic diagram for illustration of an optical action of the P-lead optical system. In FIG. 13, Gp and Gn respectively denote a front unit having positive refractive power and a rear unit having negative refractive power constituting the P-lead optical system and GIT1 and GIT2 respectively represent a refractive optical element GIT introduced into the front unit Gp and a refractive optical element GIT introduced into the rear unit Gn. For ease of explanation, it is assumed that lenses constituting the front unit Gp and the rear unit Gn are each a thin single lens and are arranged on an optical axis with a lens interval of "0" in each of the front unit Gp and the rear unit Gn. In addition, it is assumed that lenses constituting the refractive optical system portions GIT1 and GIT2 are also each a thin and single lens and are arranged on the optical axis with a lens interval of "0" in each of the front unit Gp and the rear unit Gn. Also, Q is the paraxial marginal ray, R is the paraxial chief ray, and P is an intersection of the paraxial chief ray and the optical axis.

First, an optical system before the introduction of the refractive optical system portion GIT will be considered. Expressions concerning the axial chromatic aberration coefficient (L) and the magnification chromatic aberration coefficient (T) are formulated for the front unit Gp and the rear unit Gn as follows, $$L(\lambda) = h_{Gp}^2(\lambda_0) \sum_{i=1}^{L} \phi_{Gp_i}(\lambda_0)/\nu_{Gp_i}(\lambda) + \qquad (d)$$

$$h_{Gn}^2(\lambda_0) \sum_{i=1}^{M} \phi_{Gnj}(\lambda_0)/\nu_{Gnj}(\lambda),$$

$$T(\lambda) = h_{Gp}(\lambda_0) H_{Gp}(\lambda_0) \sum_{i=1}^{L} \phi_{Gp_i}(\lambda_0)/\nu_{Gpi}(\lambda) + \qquad (e)$$

$$h_{Gn}(\lambda_0) H_{Gn}(\lambda_0) \sum_{j=1}^{M} \phi_{Gnj}(\lambda_0)/\nu_{Gnj}(\lambda)$$

where $$\nu_{Gpi}(\lambda) = \{N_{Gpi}(\lambda_0)-1\}/\{N_{Gpi}(\lambda)-N_{Gpi}(\lambda_0)\},$$

$$\nu_{Gni}(\lambda) = \{N_{Gni}(\lambda_0)-1\}/\{N_{Gnj}(\lambda)-N_{Gnj}(\lambda_0)\},$$

where $\Phi_{Gpi}$ is the refractive power (optical power) of each thin single lens constituting the front unit Gp, $\Phi_{Gni}$ is the refractive power (optical power) of each thin single lens constituting the rear unit Gn, $\nu_{Gpi}$ is the Abbe number of each thin single lens constituting the front unit Gp, $\nu_{Gni}$ is the Abbe number of each thin single lens constituting the rear unit Gn, $h_{Gp}$ is the height of the paraxial marginal ray incident on the front unit Gp, $h_{Gn}$ is the height of the paraxial marginal ray incident on the rear unit Gn, $H_{GP}$ is the height of the paraxial chief ray incident on the front unit Gp, $H_{Gn}$ is the height of the paraxial chief ray incident on the rear unit Gn, $N_{Gpi}$ is the refractive index of each thin single lens constituting the front unit Gp, $N_{Gnj}$ is the refractive index of each thin single lens constituting the rear unit Gn, $\lambda$ is an arbitrary wavelength, and $\lambda_0$ is the design wavelength.

In an ordinary P-lead optical system, in the wavelength dependence characteristic of the axial chromatic aberration coefficient L ($\lambda$) of Expression (d), the wavelength dependence characteristic of the axial chromatic aberration coefficient of the front unit Gp of the first term exhibits a tendency whose entire inclination is negative and which has a relatively sharp and upwardly convex shape. The wavelength dependence characteristic of the axial chromatic aberration coefficient of the rear unit Gn of the second term has a tendency whose entire inclination is positive and which has a downwardly convex shape. As a result, the characteristic of the front unit Gp remains to some extent as the entire system and an axial chromatic aberration coefficient wavelength dependence characteristic is exhibited whose entire inclination is negative and which has an upwardly convex shape.

Next, the sign of the refractive optical system portion GIT for correction of the axial chromatic aberration and the introduction position thereof into the optical system from the state will be considered. The axial chromatic aberration coefficient of the introduced refractive optical system portion GIT is expressed as follows, $$L_{GIT}(\lambda) = h_{GIT}^2(\lambda_0) \phi_{GIT}(\lambda_0)/\nu_{GIT}(\lambda) \qquad (f),$$

where $\Phi_{GIT}(\lambda_0)$ is the refractive power (optical power) of the refractive optical system portion GIT and $h_{GIT}(\lambda_0)$ is the height of a paraxial marginal ray incident on the refractive optical system portion GIT. Also, the following condition is satisfied, $$\nu_{GIT}(\lambda) = \{N_{GIT}(\lambda_0)-1\}/\{N_{GIT}(\lambda)-N_{GIT}(\lambda_0)\}.$$

In the expression (f), the tendency of the inclination and curve component of the dispersion characteristic $N_{GIT}(\lambda)$ of the refractive optical system portion GIT is reflected in $1/\nu_{GIT}(\lambda)$ as it is, so the wavelength dependence characteristic of the axial chromatic aberration coefficient of the refractive optical system portion GIT becomes a curve, which satisfies a condition of $\Phi_{GIT}(\lambda_0)>0$, whose entire inclination is negative, and which has a gentle and downwardly convex shape, and becomes a curve which satisfies a condition of $\Phi_{GIT}(\lambda_0)<0$, whose entire inclination is positive, and which has a gentle and upwardly convex shape.

Accordingly, in order to cancel the entire inclination component of the wavelength dependence characteristic curve of the axial chromatic aberration coefficient of the expression (d), it is required to satisfy a condition of $\Phi_{GIT}(\lambda_0)<0$. In that case, the curve component is increased, but by producing the positive lens constituting the front unit Gp using a glass material having a high dispersion characteristic (whose dispersion characteristic curve is large) and producing the negative lens using a glass material having a low dispersion characteristic (whose dispersion characteristic curve is small), it becomes possible to satisfy the condition by setting the dependence characteristic curve of the axial chromatic aberration wavelength of the entire system except for the refractive optical system portion GIT as a curve that has a large negative inclination and has a downwardly convex shape.

As to the entire inclination significantly displaced by the change of the glass material, it is sufficient to displace again the refractive power $\Phi_{GIT}(\lambda_0)$ of the refractive optical system portion GIT in a negative direction, thereby obtaining a wavelength dependence characteristic of the axial chromatic aberration coefficient in which both of the entire inclination component and the curve component have been favorably corrected.

In a optical system, the refractive optical system portion GIT is preferably disposed in the front unit Gp at which the refractive power of the refractive optical system portion GIT becomes relatively small and the displacement amount of the refractive power during the chromatic aberration correction is relatively small because $h_{Gp}^2 >> h_{Gn}^2$ is obtained from $h_{Gp} > h_{Gn}$. With this construction, the independency of the chromatic aberration correction is increased and it becomes possible to give a wavelength dependence characteristic curve of the axial chromatic aberration coefficient having a relatively high linearity to the refractive optical system portion GIT. That is, it becomes possible to reduce the curve component of the upwardly convex shape of the wavelength dependence characteristic curve of the axial chromatic aberration coefficient increased by the refractive optical system portion GIT during the chromatic aberration correction and the like and it becomes possible to obtain a curve having a downwardly convex shape with relative ease without giving a large negative inclination to the wavelength dependence characteristic curve of the axial chromatic aberration of the entire system except for the refractive optical system portion GIT.

Correction of an axial chromatic aberration has been described above.

Next, correction of a chromatic aberration of magnification will be described.

Ordinarily, in the case of the P-lead optical system, in the wavelength dependence characteristic T (λ) of the coefficient of chromatic aberration of magnification of the expression (e), the wavelength dependence characteristic of the coefficient of chromatic aberration of magnification of the front unit Gp of the first term exhibits a tendency whose entire inclination is positive and which has a relatively strong downwardly convex shape. The wavelength dependence characteristic of coefficient of chromatic aberration of magnification of the rear unit Gn of the second term exhibits a tendency whose entire inclination is negative and which has an upwardly convex shape. As a result, the characteristic of the front unit Gp is remained to some extent as the entire system and a wavelength dependence characteristic of the coefficient of chromatic aberration of magnification is exhibited whose entire inclination is positive and which has a downwardly convex shape.

The coefficient of chromatic aberration of magnification of the refractive optical system portion GIT introduced into the front unit Gp for the sake of the axial chromatic aberration correction described above is as follows.

$$T_{GIT}(\lambda) = h_{Gp}(\lambda_0) H_{Gp}(\lambda_0) \phi_{GIT}(\lambda_0) / \nu_{GIT}(\lambda) \qquad (g)$$

In Expression (g), the tendency of the inclination and curve component of the dispersion characteristic $N_{GIT}(\lambda)$ of the refractive optical system portion GIT is reflected in $1/\nu_{GIT}(\lambda)$ as it is. Therefore, from $h_{Gp}(\lambda_0) > 0$ and $H_{Gp}(\lambda_0) < 0$, the wavelength dependence characteristic of the coefficient of chromatic aberration of magnification of the refractive optical system portion GIT becomes a curve which satisfies a condition of $\Phi_{GIT}(\lambda_0) < 0$, whose entire inclination is negative, and which has a gentle and downwardly convex shape. As a result, it becomes possible to cancel the entire inclination component of the wavelength dependence characteristic curve of the coefficient of chromatic aberration of magnification of the expression (e) as well. In that case, the curve component is enhanced, but by producing the positive lens constituting the front unit Gp using a glass material having a high dispersion characteristic (whose dispersion characteristic curve is large) and producing the negative lens using a glass material having a low dispersion characteristic (whose dispersion characteristic curve is small), during the correction of the axial chromatic aberration described above, the wavelength dependence characteristic curve of the coefficient of chromatic aberration of magnification of the entire system except for the refractive optical system portion GIT becomes a curve having a large positive inclination and an upwardly convex shape and therefore the curve component is also canceled at the same time. The entire inclination greatly displaced by the change of the glass material can be also corrected by changing the refractive power $\Phi_{GIT}(\lambda_0)$ of the refractive optical system portion GIT again in the negative direction during the correction of the axial chromatic aberration described above.

Up to this point, the description is made that it is possible to correct the axial chromatic aberration and the chromatic aberration of magnification at the same time by giving negative refractive power to the refractive optical system portion GIT and introducing it into the front unit Gp having positive refractive power.

Next, the sign of the optical power and introduction position of the refractive optical system portion GIT in consideration of specialization on the correction of the chromatic aberration of magnification will be described.

The axial chromatic aberration coefficient $L_{GIT}(\lambda)$ and the coefficient of chromatic aberration of magnification $T_{GIT}(\lambda)$ of the refractive optical system portion GIT in the case where the refractive optical system portion GIT has been introduced into the rear unit Gn become as follows.

$$L_{GIT}(\lambda) = h_{Gn}^2(\lambda_0) \phi_{GIT}(\lambda_0) / \nu_{GIT}(\lambda) \qquad (h)$$

$$T_{GIT}(\lambda) = h_{Gn}(\lambda_0) H_{Gn}(\lambda_0) \phi_{GIT}(\lambda_0) / \nu_{GIT}(\lambda) \qquad (i)$$

Here, in the case of the P-lead optical system, the following expression is satisfied, $$0 < h_{Gn}(\lambda_0) < H_{Gn}(\lambda_0).$$

Therefore, the following expression is obtained.

$$0 < h_{Gn}^2(\lambda_0) < h_{Gn}(\lambda_0) H_{Gn}(\lambda_0)$$

That is, when the refractive optical system portion GIT is disposed in the rear unit Gn having negative refractive power of the P-lead optical system, contribution to the chromatic aberration of magnification becomes greater than that to the axial chromatic aberration. Consequently, in the expression (i), the tendency of the inclination and curve component of the dispersion characteristic $N_{GIT}(\lambda)$ of the refractive optical system portion GIT is reflected in $1/\nu_{GIT}(\lambda)$ as it is, so by satisfying a condition of $\Phi_{GIT}(\lambda_0) > 0$, it becomes possible to give a wavelength dependence characteristic curve of the coefficient of chromatic aberration of magnification whose entire inclination is negative and which has a downwardly convex shape and it becomes possible to cancel the entire inclination component of the wavelength dependence characteristic curve of the coefficient of chromatic aberration of magnification of the entire system without exerting influences on the axial chromatic aberration. In that case, as to the correction of the curve component, like in the case described above, it is possible to easily make the correction through selection of a glass material used to produce the front unit Gp.

Up to this point, the conditions that are necessary for the correction of the chromatic aberrations of the P-lead optical system and should be given to the refractive optical system portion GIT are described.

In summary, when the intersection of the optical axis and the paraxial chief ray is referred to as "P", the refractive optical system portion GIT should have negative refractive power when the refractive optical system portion GIT is disposed in front side with respect to the point P (on the enlargement side, that is, the object side in the case of the photographing optical system of a camera or the like and a screen side in the case of the projection optical system of a projector or the like), and the refractive optical system portion GIT should have positive refractive power when the refractive optical system portion GIT is disposed in rear side with respect to the point P (on the reduction side, that is, the image side in the case of the photographing optical system of a camera or the like and the original image side in the case of the projection optical system of a projector or the like). In particular, it is sufficient that the refractive optical system portion GIT having negative refractive power is disposed in the lens unit arranged in front side with respect to the point P and having positive refractive power and the refractive optical system portion GIT having the positive refractive power is disposed in the lens unit arranged in rear side with respect to the point P and having negative refractive power.

Figure 14:
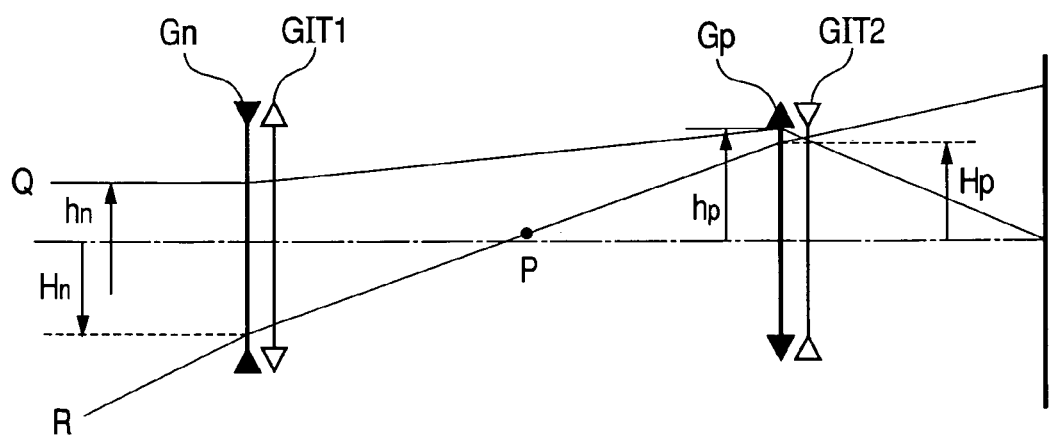
FIG. 14 is a paraxial arrangement schematic diagram for illustration of an action of the optical system according to the present invention.

Also, like the case of the P-lead optical system, it is possible to explain conditions, which are necessary to correct the chromatic aberrations of a negative-lead (N-lead)-type optical system, in which a lens unit having negative refractive power is disposed in the most object side, and should be given to the refractive optical system portion GIT, using a paraxial arrangement schematic diagram in FIG. 14 for illustration of an action of the N-lead optical system.

The detailed description is basically the same as that in the case of the P-lead optical system and therefore will be omitted. Therefore, in conclusion, in the case of the N-lead optical system, when an intersection of the optical axis and the paraxial chief ray is referred to as "P", positive refractive power is given to the refractive optical system portion GIT when the refractive optical system portion GIT is disposed in front side with respect to the point P and negative refractive power is given to the refractive optical system portion GIT when the refractive optical system portion GIT is disposed in rear side with respect to the point P. In particular, it is sufficient that the refractive optical system portion GIT having positive refractive power is disposed in the lens unit arranged in front side with respect to the point P and having negative refractive power and the refractive optical system portion GIT having negative refractive power is disposed in the lens unit arranged in rear side with respect to the point P and having positive refractive power.

Next, embodiments will be described in each of which a material satisfying the conditional expressions (1) to (3) is applied to a concrete optical system.

FIG. 1 is a main portion schematic diagram in the case where an optical system according to a first embodiment of the present invention is applied to an image projection apparatus (liquid crystal video projector).

Figure 2B:
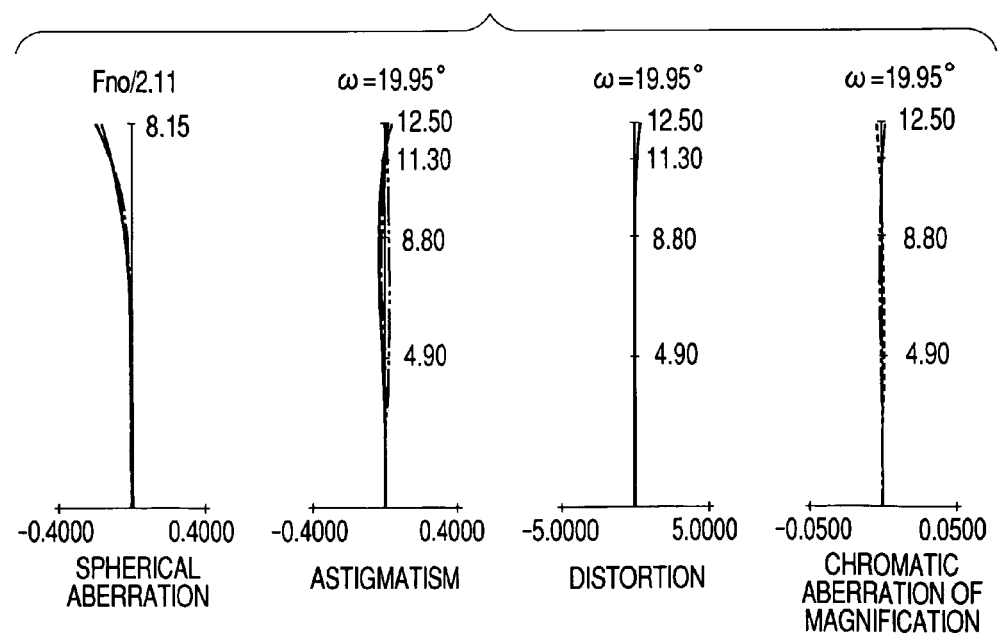

FIGS. 2A and 2B are respectively aberration diagrams at wide angle end (short focal length end) and tele photo end (long focal length end) of the optical system according to the first embodiment.

FIG. 3 is a main portion schematic diagram in the case where an optical system according to a second embodiment of the present invention is applied to an image projection apparatus (liquid crystal video projector).

Figure 4A:
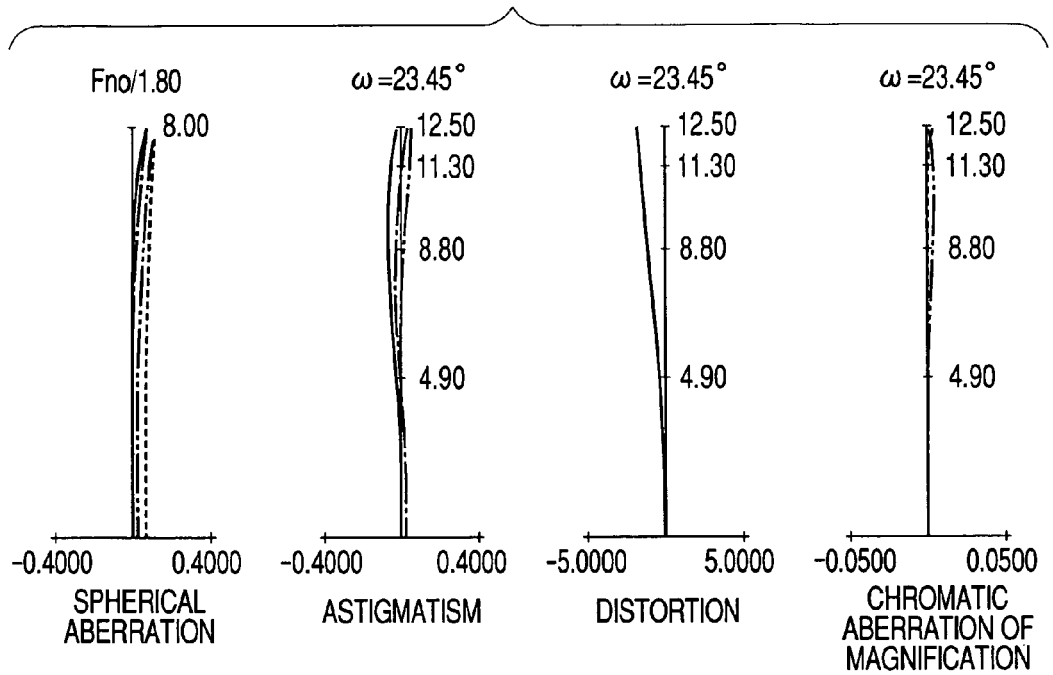
FIGS. 4A and 4B are aberration diagrams of the optical system in the second embodiment.
Figure 4B:
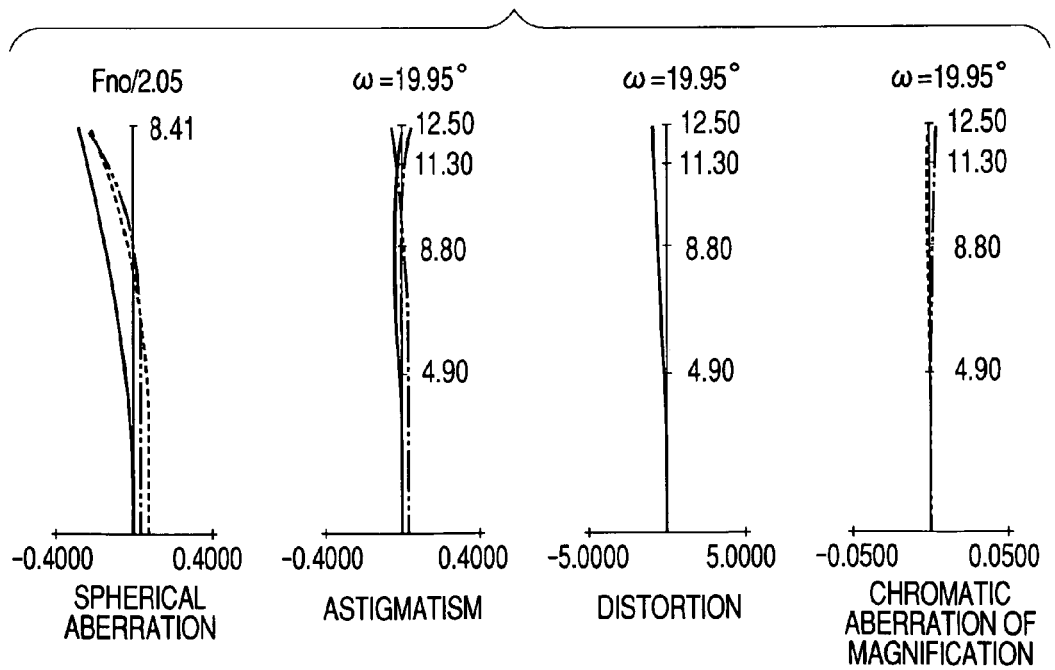

FIGS. 4A and 4B are respectively aberration diagrams at wide angle end (short focal length end) and tele photo end (long focal length end) of the optical system according to the second embodiment.

Figure 5:
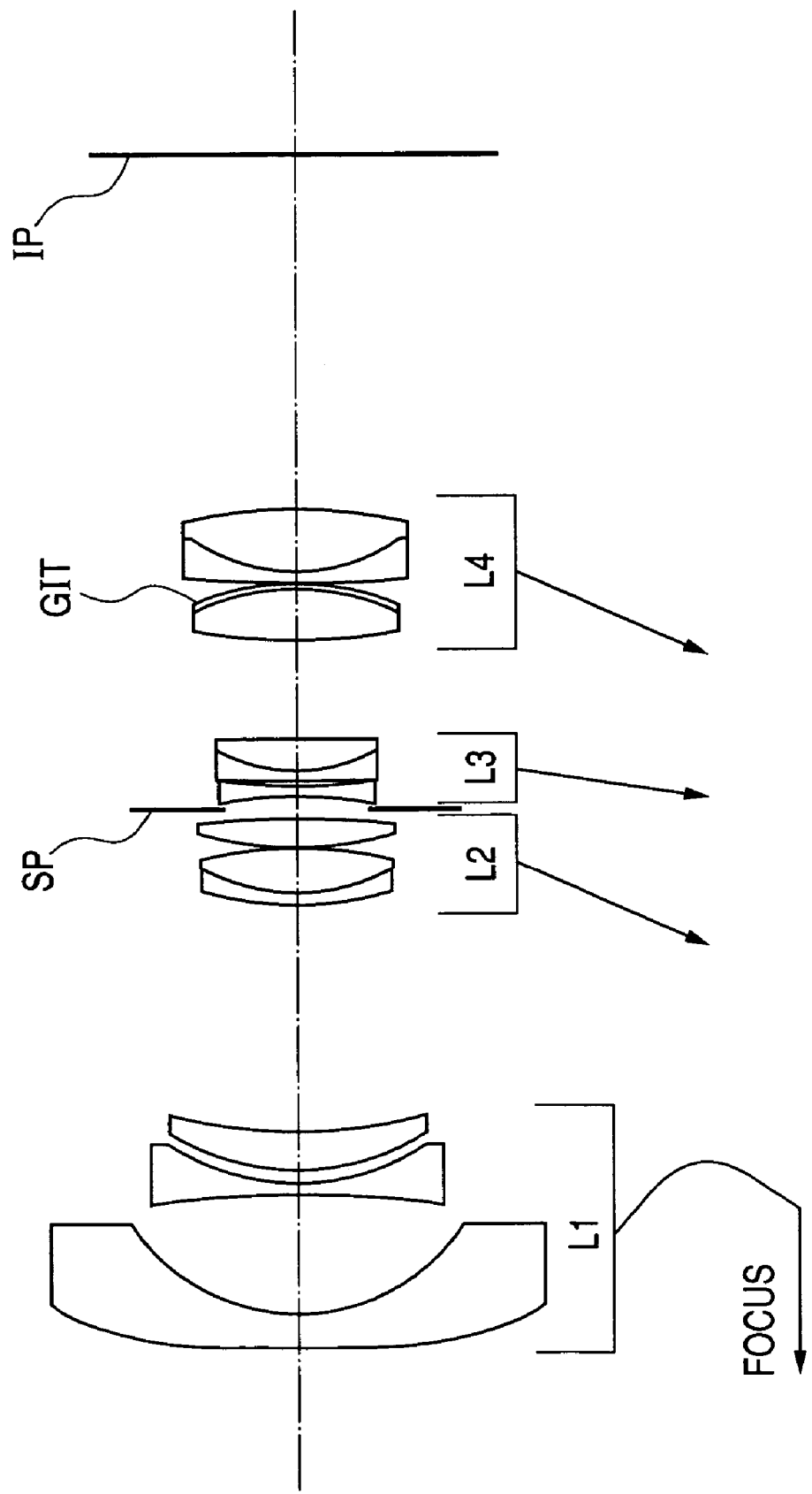
FIG. 5 is a lens cross-sectional view of an optical system in a third embodiment.

FIG. 5 is a lens cross-sectional view of an optical system according to a third embodiment of the present invention.

Figure 6A:
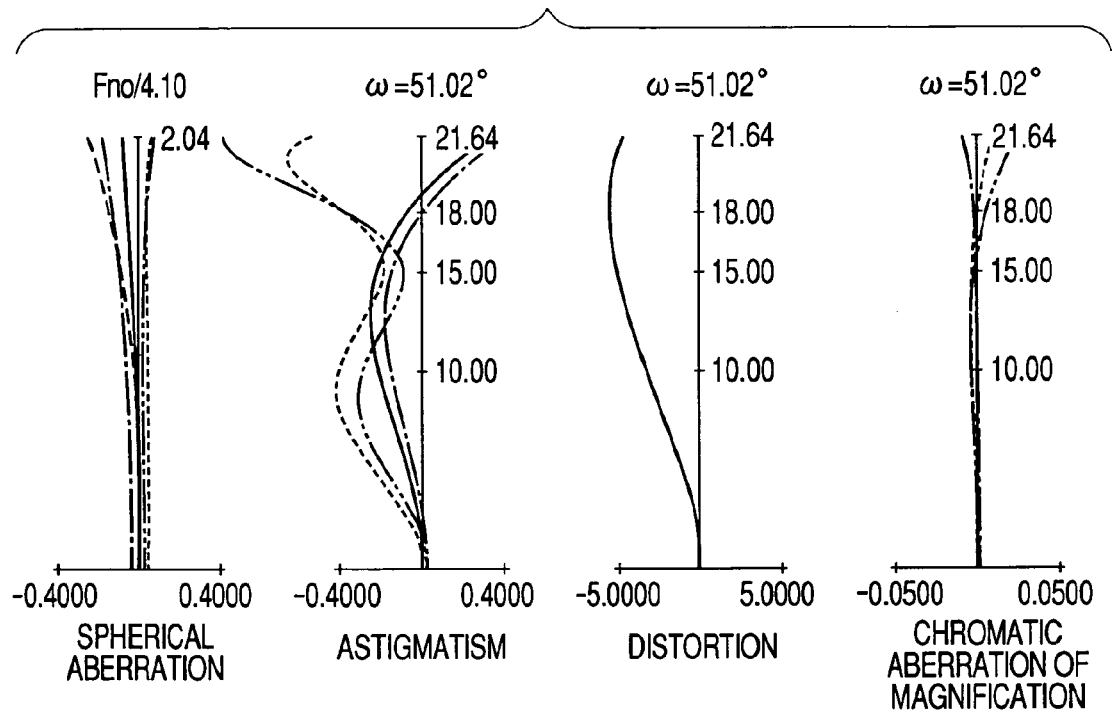
FIGS. 6A and 6B are aberration diagrams of the optical system in the third embodiment.
Figure 6B:
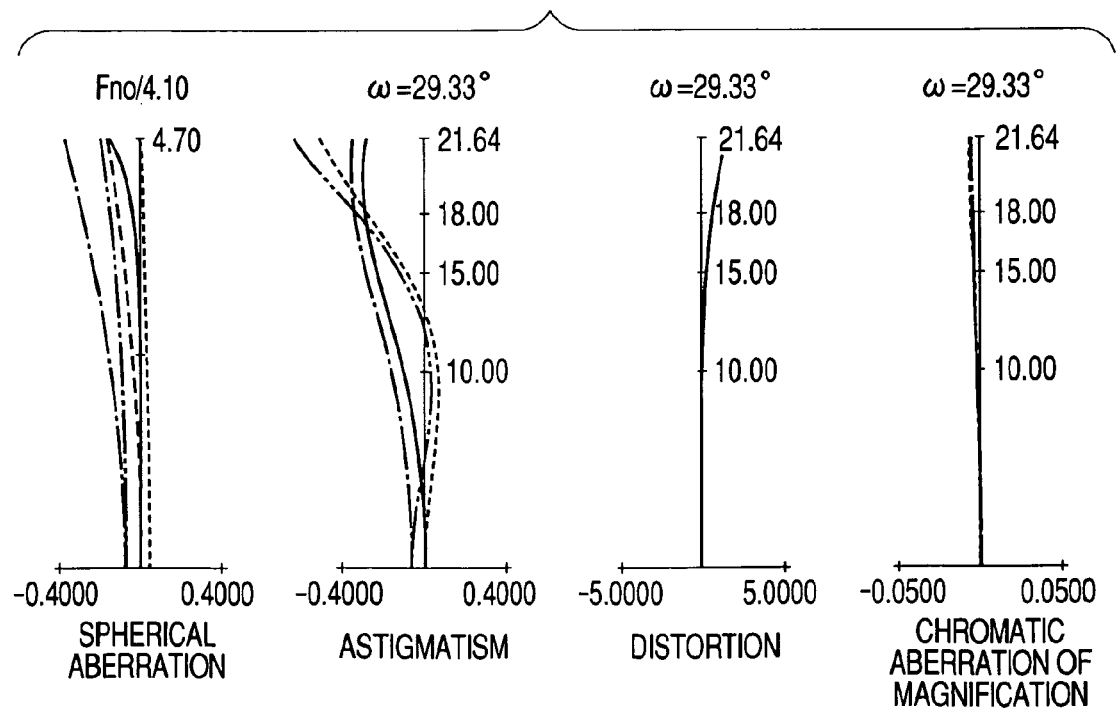

FIGS. 6A and 6B are respectively aberration diagrams at wide angle end and tele photo end of the optical system according to the third embodiment.

Figure 7:
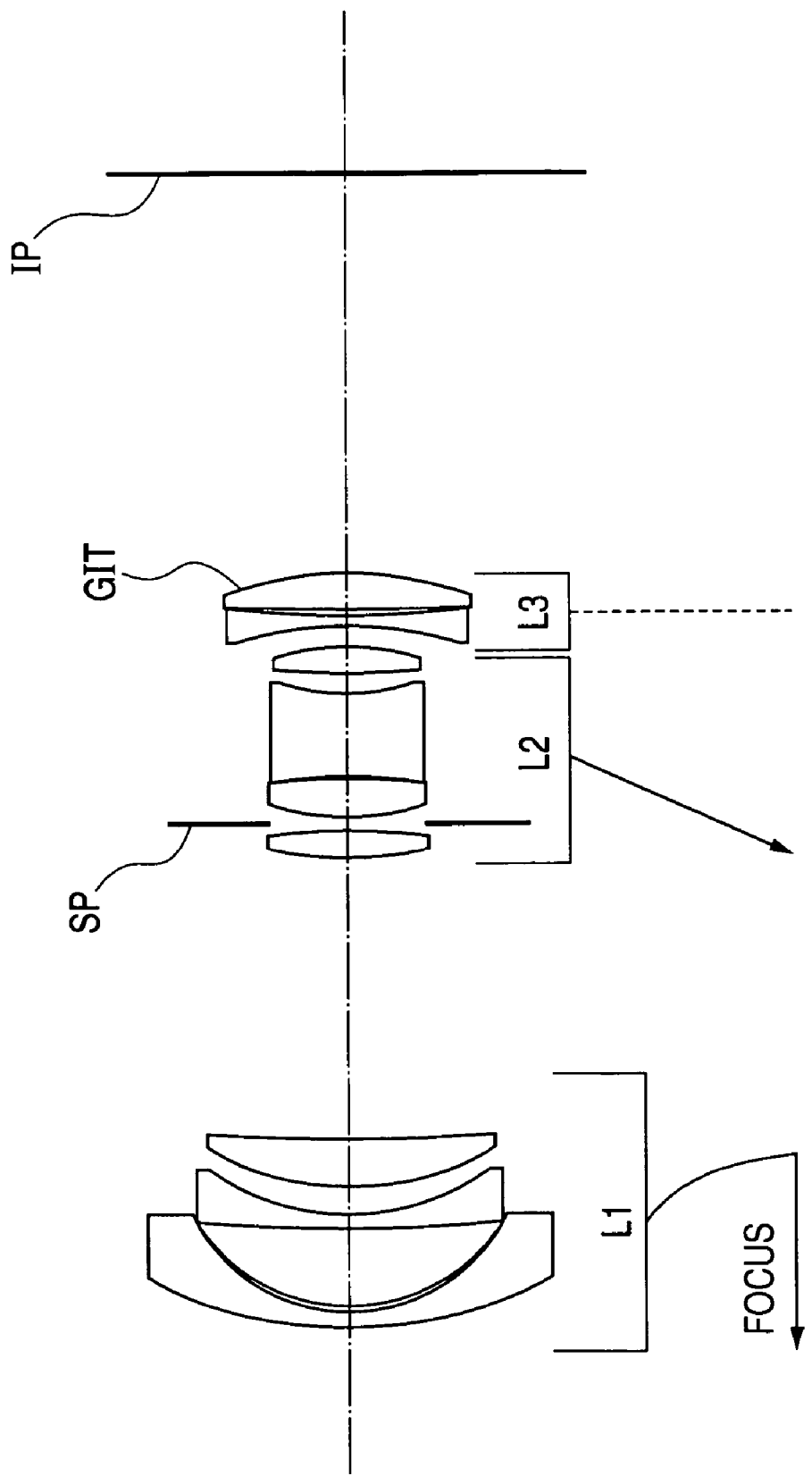
FIG. 7 is a lens cross-sectional view of an optical system in a fourth embodiment.

FIG. 7 is a lens cross-sectional view of an optical system according to a fourth embodiment of the present invention.

Figure 8A:
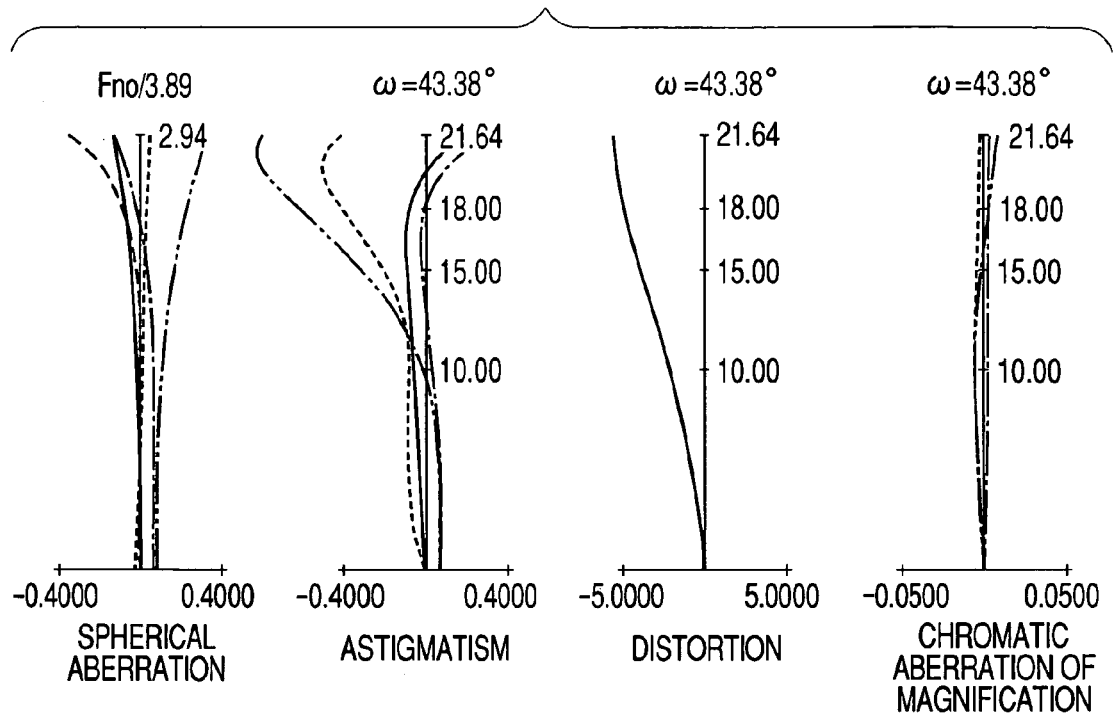
FIGS. 8A and 8B are aberration diagrams of the optical system in the fourth embodiment.
Figure 8B:
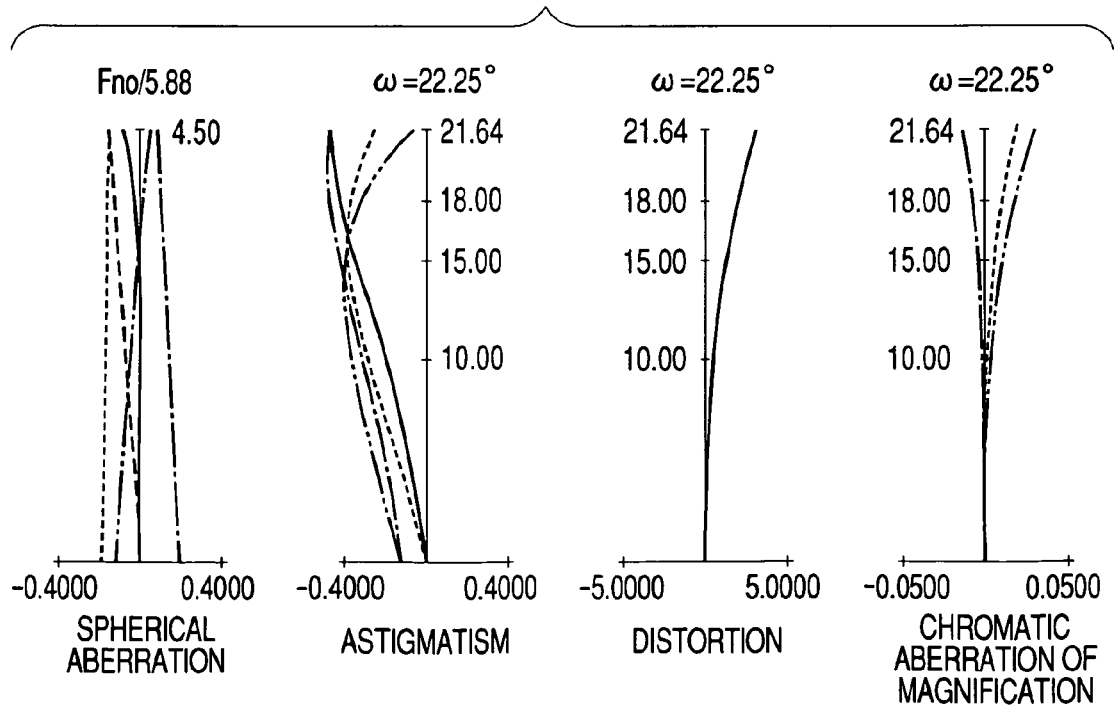

FIGS. 8A and 8B are respectively aberration diagrams at wide angle end and tele photo end of the optical system according to the fourth embodiment.

Figure 9:
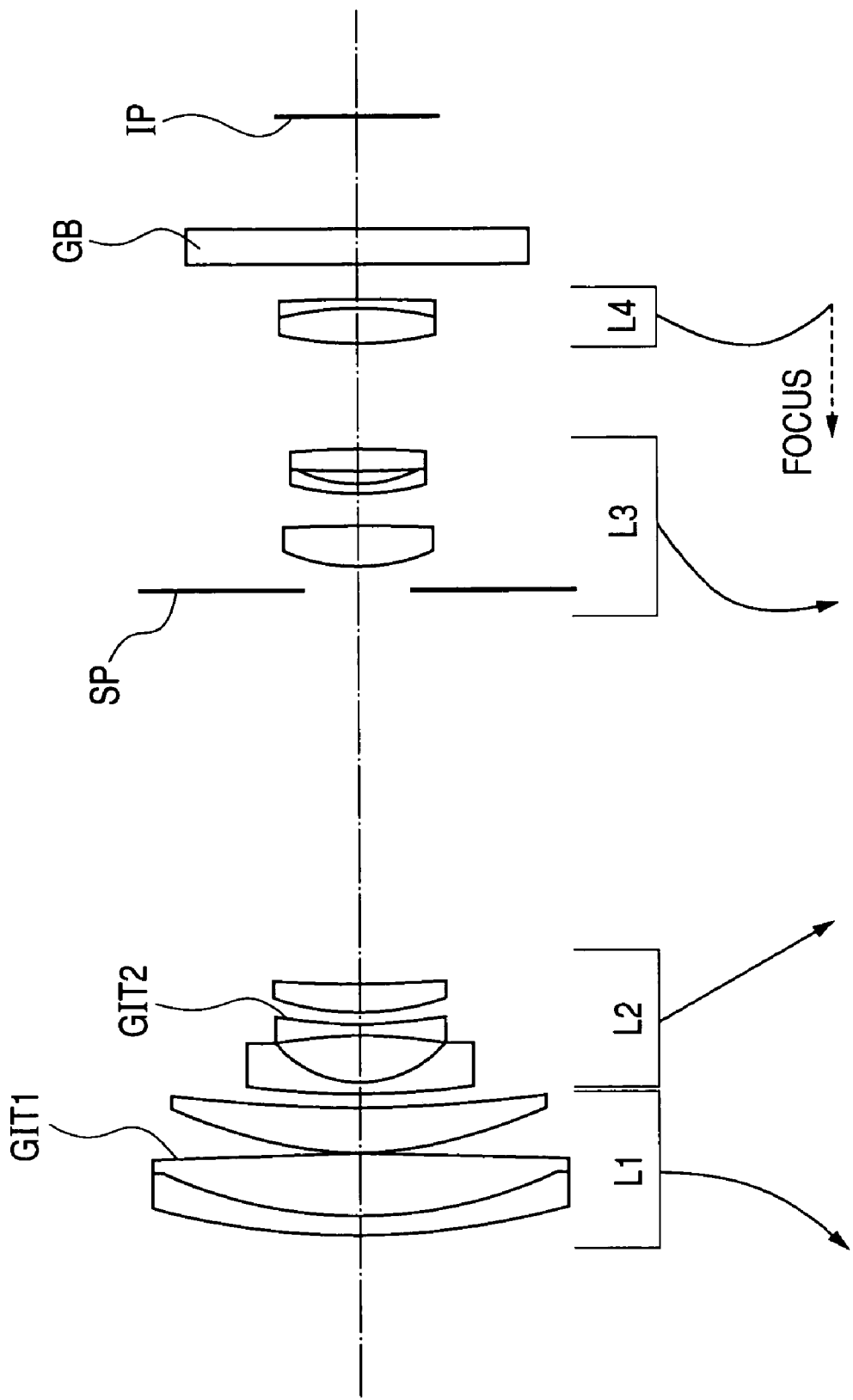
FIG. 9 is a lens cross-sectional view of an optical system in a fifth embodiment.

FIG. 9 is a lens cross-sectional view of an optical system according to a fifth embodiment of the present invention.

Figure 10A:
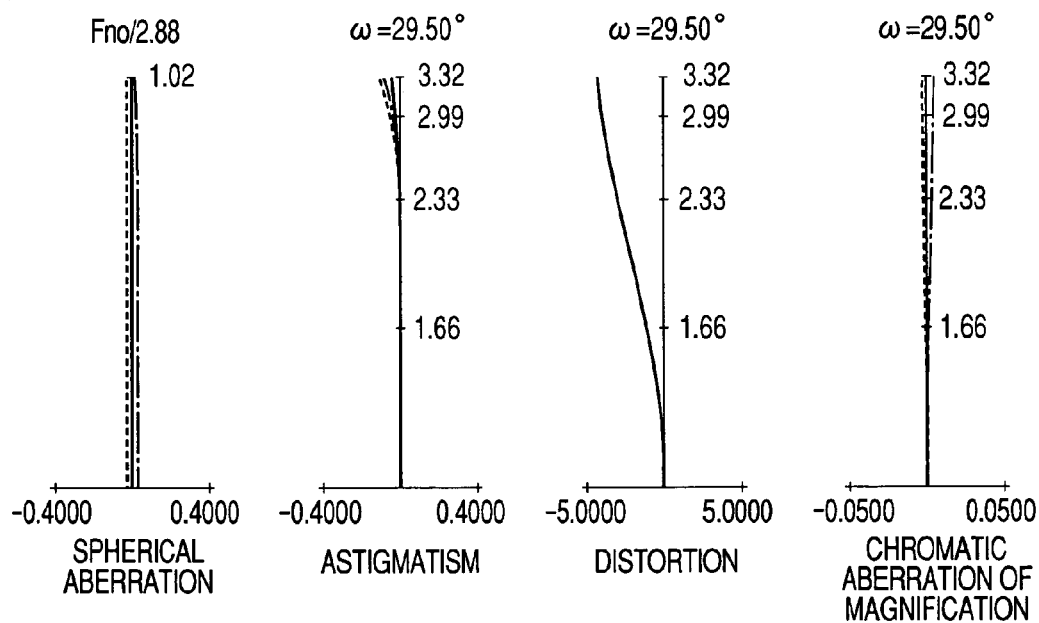
FIGS. 10A and 10B are aberration diagrams of the optical system in the fifth embodiment.
Figure 10B:
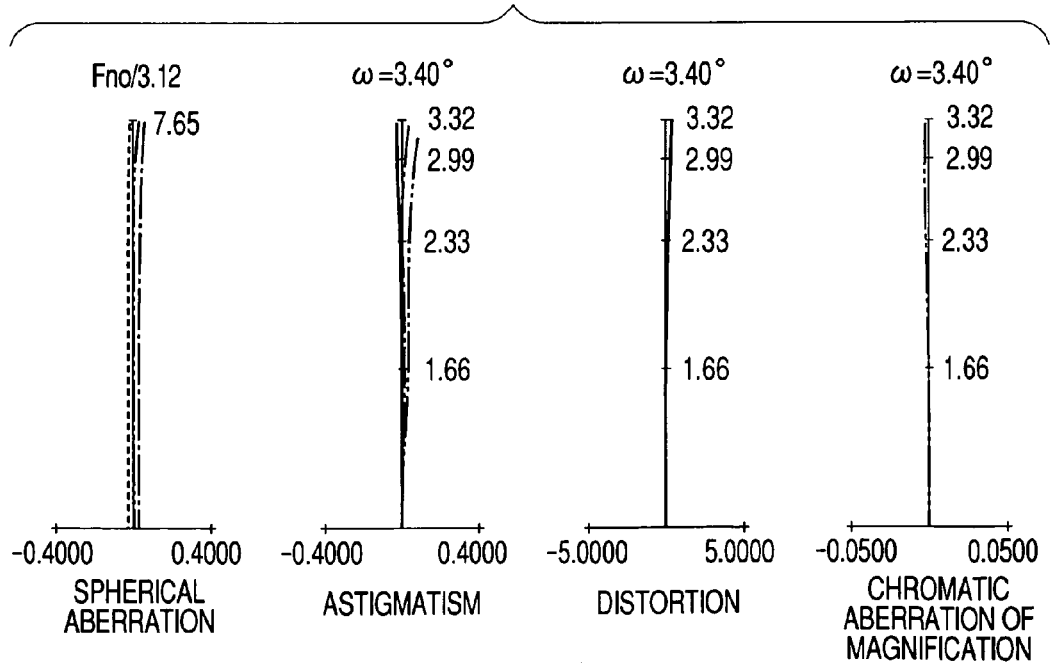

FIGS. 10A and 10B are respectively aberration diagrams at wide angle end and tele photo end of the optical system according to the fifth embodiment.

Figure 11:
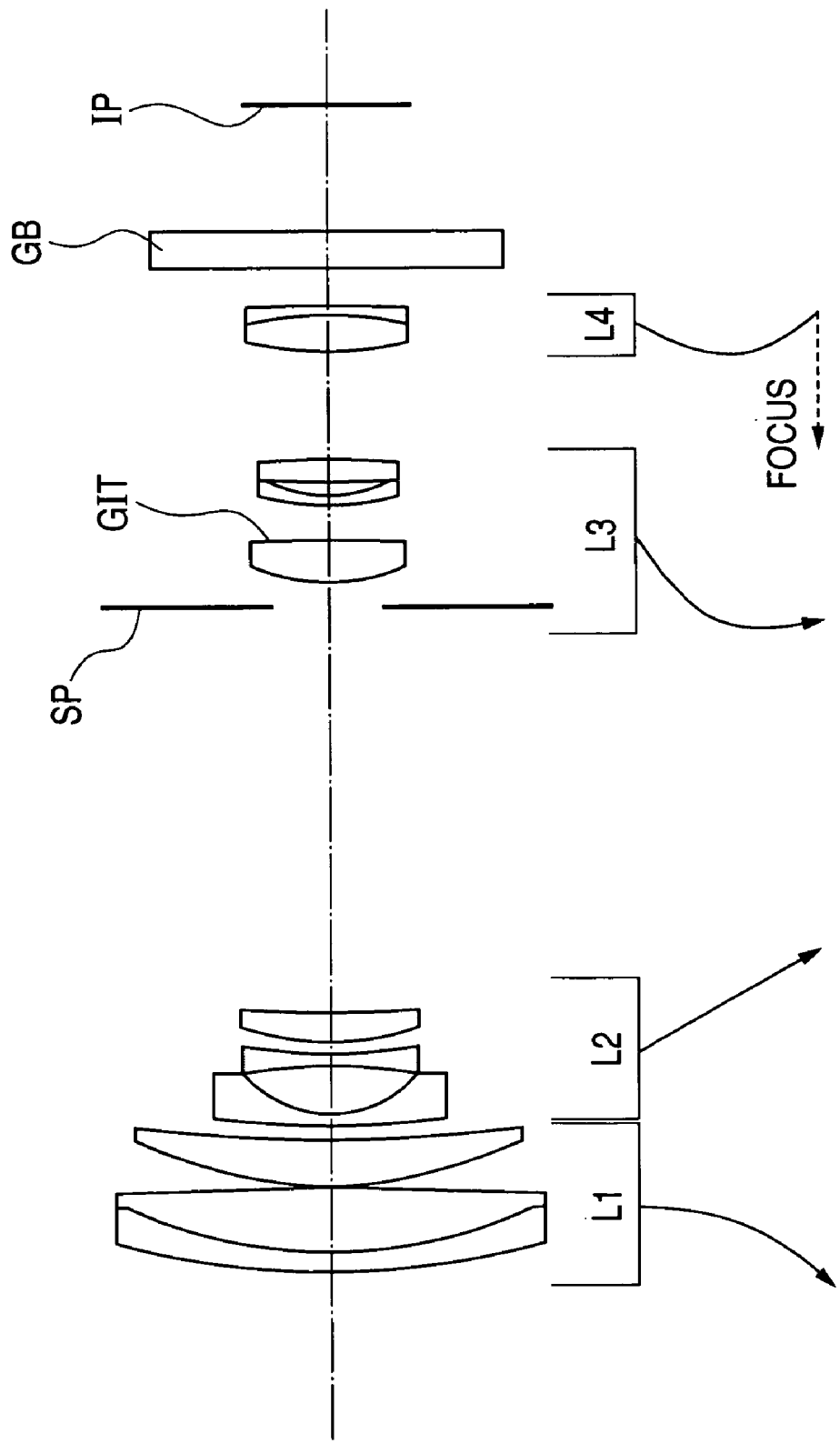
FIG. 11 is a lens cross-sectional view of an optical system in a sixth embodiment.

FIG. 11 is a lens cross-sectional view of an optical system according to a sixth embodiment of the present invention.

Figure 12A:
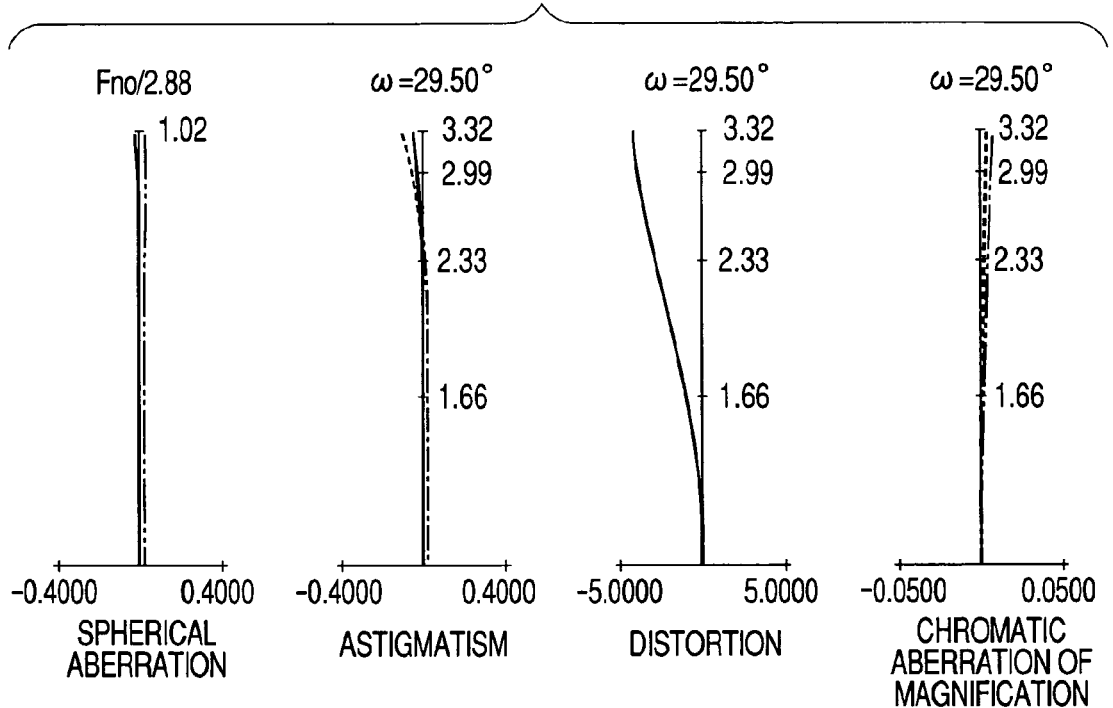
FIGS. 12A and 12B are aberration diagrams of the optical system in the sixth embodiment.
Figure 12B:
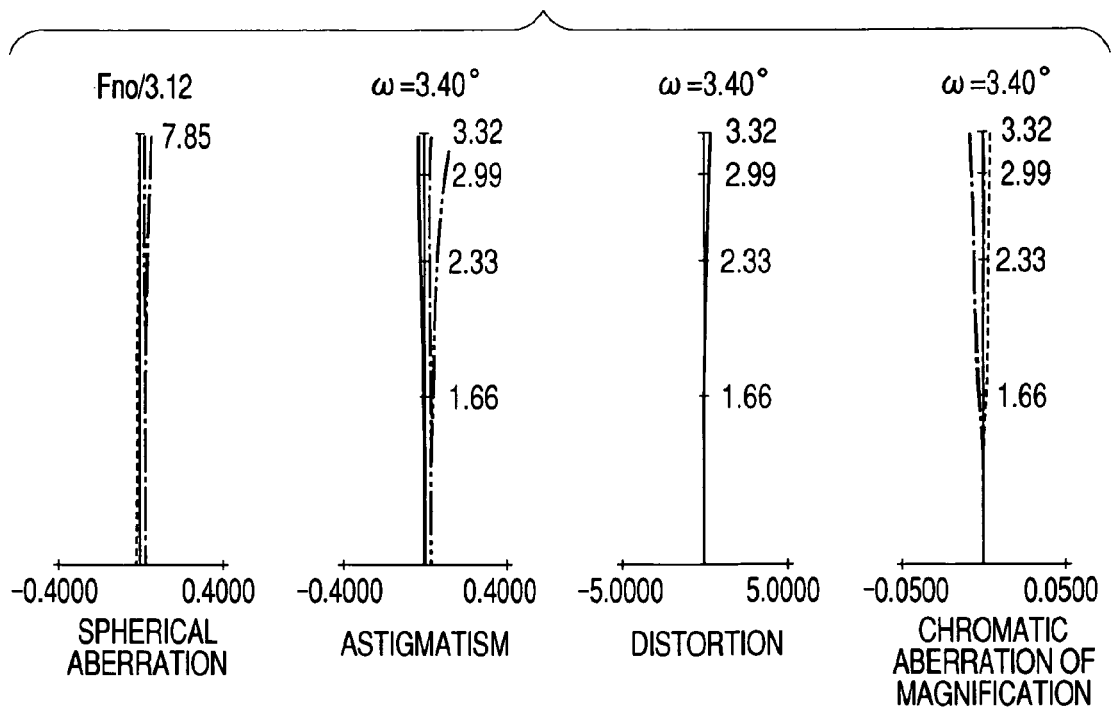

FIGS. 12A and 12B are respectively aberration diagrams at wide angle end and tele photo end of the optical system according to the sixth embodiment.

Figure 16:
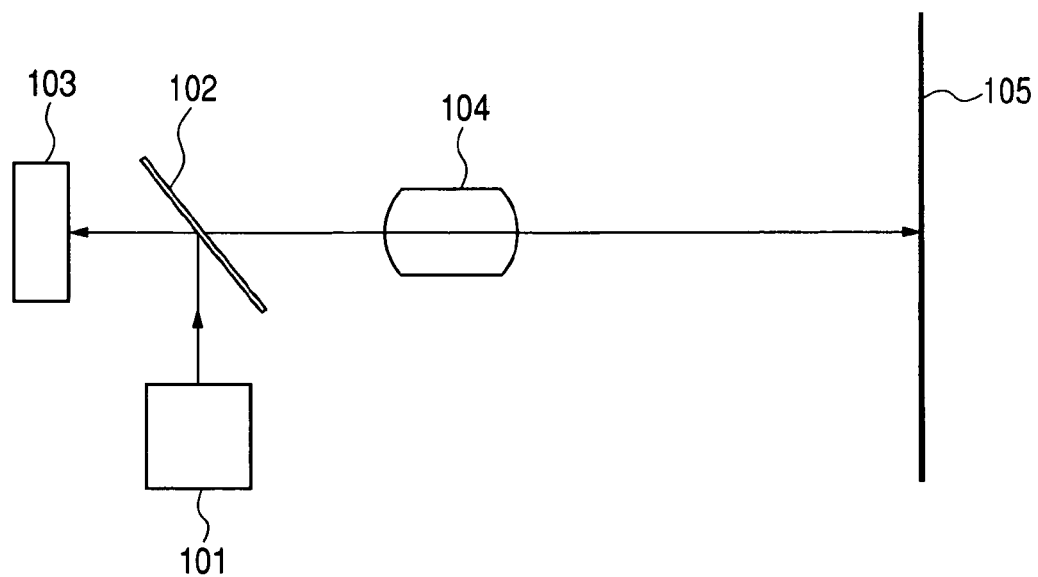
FIG. 16 is a schematic diagram of a main portion of a reflection-type liquid crystal projector according to the present invention.

FIG. 16 is a main portion schematic diagram of an embodiment where the optical system according to the present invention is applied to a reflection-type liquid crystal projector (image projection apparatus).

Figure 17:
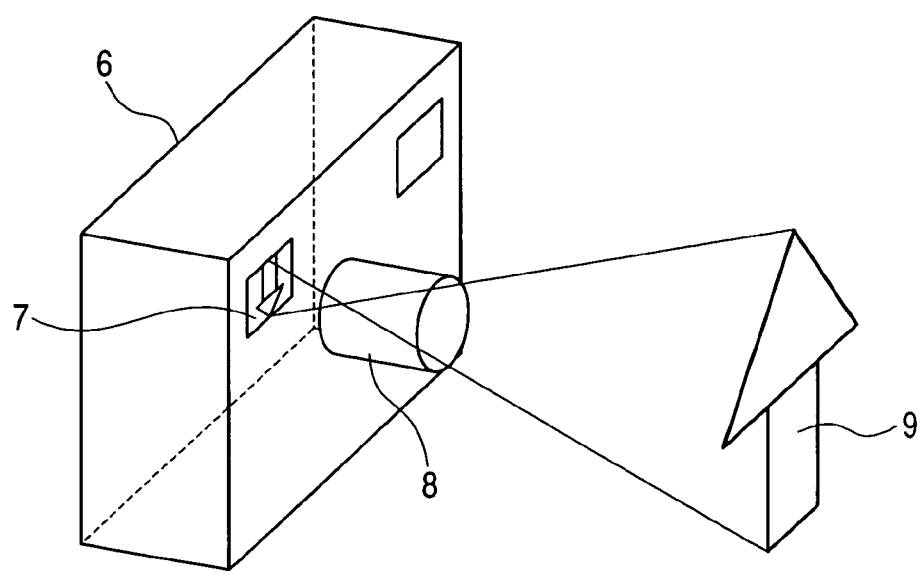
FIG. 17 is a schematic view of a main portion of an image pickup apparatus according to the present invention.

FIG. 17 is a main portion schematic view of an embodiment where the optical system according to the present invention is applied to an image pickup apparatus of a digital camera, a video camera, or the like.

In each of the first and second embodiments shown in FIGS. 1 and 3, the image projection apparatus enlarges and projects an original image (projection target image) displayed by a liquid crystal panel LCD or the like onto a screen surface S using a zoom lens (projection lens, throwing lens) PL as an optical system.

In FIGS. 1 and 3, S denotes a screen surface (projection surface) and LCD indicates an original image (an image to be projected) of a liquid crystal panel (liquid crystal display element) or the like. The screen surface S and the original image LCD are in a conjugate relation and, generally, the screen surface S corresponds to a long-distance conjugate point on an enlargement conjugate side (front side) and the original image LCD corresponds to a short-distance conjugate point on a reduction conjugate side (rear side).

The zoom lens PL is mounted to the main body (not shown) of the liquid crystal video projector through a connection member (not shown). A liquid crystal display element LCD side following a glass block GB is contained in the projector main body.

The optical systems according to the third to sixth embodiments shown in FIGS. 5, 7, 9, and 11 are each a photographing lens for an image pickup apparatus such as a digital camera or a video camera.

In FIGS. 5, 7, 9, and 11, IP denotes an image plane and a CCD image sensor, an image pickup element such as a CMOS image sensor, or a photosensitive material like a film is disposed.

In FIGS. 1, 3, 5, 7, 9, and 11, Li denotes the i-th lens unit and SP indicates an aperture stop. The intersection P described above of the optical axis and the pupil paraxial ray coincides with the center of the aperture stop SP. Also, GB denotes a glass block that is provided so as to correspond to a color synthesis prism, a polarizing filter, or the like in FIGS. 1 and 3 and to correspond to an infrared cut filter, an optical low-pass filter, or the like in FIGS. 5, 7, 9, and 11.

Further, GIT denotes a refractive optical element (layer or lens) made of a mixture where inorganic fine particles are dispersed in a medium material.

In FIGS. 5, 7, 9, and 11, arrows represent loci of the lens units during zooming from the wide angle end to the tele photo end.

In addition, FOCUS indicates a lens unit that moves during focusing.

Also, in each of the aberration diagrams relating to the first and second embodiments, as to spherical aberration, the solid line represents values at a wavelength of 550 nm, the two-dot chain line represents values at a wavelength of 440 nm, the one-dot chain line represents values at a wavelength of 620 nm, and the chain line represents values at a wavelength of 470 nm. Also, as to astigmatism, the solid line represents a sagittal image plane at the wavelength of 550 nm, the chain line represents a meridional image plane at the wavelength of 550 nm, the one-dot chain line represents a sagittal image plane at the wavelength of 440 nm, and the two-dot chain line represents a meridional image plane at the wavelength of 440 nm. Further, distortion is the wavelength of 550 nm. Still further, as to chromatic aberration of magnification, the two-dot chain line represents the wavelength of 440 nm, the one-dot chain line represents the wavelength of 470 nm, and the chain line represents the wavelength of 620 nm. Meanwhile, in each of the aberration diagrams relating to the remaining third to sixth embodiments, as to the spherical aberration, the solid line represents d-line, the two-dot chain line represents g-line, the one-dot chain line represents C-line, and the chain line represents F-line. Also, as to the astigmatism, the solid line represents a d-line sagittal image plane, the chain line represents a d-line meridional image plane, the one-dot chain line represents a g-line sagittal image plane, and the two-dot chain line indicates a g-line meridional image plane. Further, distortion is shown for d-line. Still further, as to the chromatic aberration of magnification, the two-dot chain line represents g-line, the one-dot chain line represents C-line, and the chain line represents F-line.

The stop SP is disposed between the third lens unit L3 and the fourth lens unit L4 in the first and second embodiments, between the second lens unit L2 and the third lens unit L3 in the third embodiment, in the second lens unit L2 in the fourth embodiment, and between the second lens unit L2 and the third lens unit L3 in the remaining fifth and sixth embodiments.

Next, features of the lens construction in each embodiment will be described with reference to corresponding drawings.

The first embodiment shown in FIG. 1 is a zoom lens having a six-unit construction where a first lens unit L1 having negative refractive power (optical power), a second lens unit L2 having positive refractive power, a third lens unit L3 having positive refractive power, a fourth lens unit L4 having negative refractive power, a fifth lens unit L5 having positive refractive power, and a sixth lens unit L6 having positive refractive power are arranged in order from the enlargement conjugate side (front side). A lens surface of the sixth lens unit L6 on the enlargement conjugate side is provided with a mixture layer (refractive optical system portion GIT) where inorganic fine particles are dispersed. In this embodiment, ITO (Indium-Tin Oxide) is used as the inorganic fine particles and PMMA is used as the medium material for dispersion of the inorganic fine particles, with ITO and PMMA being mixed at a volume ratio of 20%:80%. Also, the refractive power Φ of the layer GIT is configured to have negative refractive power that is opposite to the positive refractive power of the sixth lens unit L6 that is the lens unit in which the layer GIT is contained.

Here, letting Ra be the radius of curvature of a surface GITa on the enlargement conjugate side of the layer GIT, Rb be the radius of curvature of a surface GITb on the reduction conjugate side (rear side) of the layer GIT, n be the refractive index of the material of the layer GIT, and d be the thickness on the optical axis of the layer GIT, the refractive power Φ of the layer GIT is obtained from a known expression given below.

$$\phi = (n-1)\left(\frac{1}{Ra} - \frac{1}{Rb}\right) - \frac{(n-1)}{n}\frac{d}{Ra\,Rb}$$

It should be noted here that during zooming from the wide angle end to the tele photo end, the first lens unit L1 and the sixth lens unit L6 are not moved. Also, focusing is performed by moving the first lens unit L1. In the first embodiment, a retrofocus-type lens construction is used in which the first lens unit L1 having negative refractive power is arranged on the most enlargement conjugate side, thereby obtaining long back focus that is necessary for arrangement of the glass block, such as a color synthesis prism, on the reduction conjugate side.

Also, the lens unit L6 having positive refractive power is disposed on the most reduction conjugate side, thereby configuring telecentric with respect to a reduction conjugate surface (liquid crystal display element LCD). Also, the chromatic aberration of magnification is favorably corrected by providing the mixture layer GIT in which the inorganic fine particles are dispersed in a lens surface on the reduction conjugate side with respect to the stop SP where the passage position of the paraxial chief ray is relatively high with respect to the optical axis, and by giving negative refractive power that is opposite to the positive refractive power of the sixth lens unit L6 to the mixture layer GIT.

The second embodiment shown in FIG. 3 is a zoom lens having a six-unit construction where a first lens unit L1 having negative refractive power, a second lens unit L2 having positive refractive power, a third lens unit L3 having positive refractive power, a fourth lens unit L4 having negative refractive power, a fifth lens unit L5 having positive refractive power, and a sixth lens unit L6 having positive refractive power are arranged in order from the enlargement conjugate side. This embodiment is an example where a mixture layer (made of the same material as in the first embodiment) where inorganic fine particles are dispersed is provided for a lens surface of the first lens of the first lens unit L1 on the reduction conjugate side. In that case, the refractive power of the mixture layer GIT is made to have positive refractive power that is opposite to the negative refractive power of the first lens unit L1 that is a lens unit containing a lens surface for which the layer GIT is provided.

It should be noted here that in the optical system in this embodiment, like in the first embodiment, during zooming from the wide angle end to the tele photo end, the first lens unit L1 and the sixth lens unit L6 are not moved. Also, like in the first embodiment, focusing is performed by moving the first lens unit L1. The optical action of each lens unit is fundamentally the same as that in the first embodiment. The chromatic aberration of magnification is favorably corrected by providing the mixture layer GIT in which the inorganic fine particles are dispersed in a lens surface on the reduction conjugate side with respect to the stop SP where a passage position of a paraxial chief ray becomes relatively high with respect to the optical axis and by giving positive refractive power that is opposite to the negative refractive power of the first lens unit L1 to the mixture layer GIT,.

The third embodiment shown in FIG. 5 is a zoom lens having a four-unit construction where a first lens unit L1 having negative refractive power, a second lens unit L2 having positive refractive power, a third lens unit L3 having negative refractive power, and a fourth lens unit L4 having positive refractive power are arranged in order from an object side (front side). A mixture layer (made of the same material as in the first embodiment) where inorganic fine particles are dispersed is provided for a lens surface on an image side of the first lens of the fourth lens unit L4. In that case, the refractive power of the mixture layer GIT is made to have negative refractive power that is opposite to the positive refractive power of the fourth lens unit L4.

In the optical system in the third embodiment, during zooming from the wide angle end to the tele photo end, the lens units are moved on the optical axis so as to have loci indicated by the arrows in FIG. 5. Also, focusing is performed by moving the first lens unit L1. The optical action of each lens unit is fundamentally the same as that in the first and second embodiments and the chromatic aberration of magnification is favorably corrected by providing the mixture layer GIT in which the inorganic fine particles of ITO are dispersed in the lens surface on the image side with respect to the stop SP where a passage position of a paraxial chief ray becomes relatively high with respect to the optical axis and by giving negative refractive power to the mixture layer GIT.

The fourth embodiment shown in FIG. 7 is a zoom lens having a three-unit construction where a first lens unit L1 having negative refractive power, a second lens unit L2 having positive refractive power, and a third lens unit L3 having negative refractive power are arranged in order from the object side. A mixture layer (made of the same material as in the first embodiment) where inorganic fine particles are dispersed is provided for a lens surface on the image side of the first lens of the first lens unit L1. In that case, the refractive power of the mixture layer GIT is made to have positive refractive power that is opposite to the negative refractive power of the first lens unit L1. Note that during zooming from the wide angle end to the tele photo end, the lens units are moved so as to have loci indicated by the arrows in FIG. 7. Also, focusing is performed by moving the first lens unit L1. As to the optical action of each lens unit, the chromatic aberration of magnification is favorably corrected by providing the mixture layer GIT where the inorganic fine particles are dispersed on the object side with respect to the stop SP where a passage position of a paraxial chief ray becomes relatively high with respect to the optical axis and by giving positive refractive power to the mixture layer GIT.

The fifth embodiment shown in FIG. 9 is a zoom lens having a four-unit construction where a first lens unit L1 having positive refractive power, a second lens unit L2 having negative refractive power, a third lens unit L3 having positive refractive power, and a fourth lens unit L4 having positive refractive power are arranged in order from the object side. A mixture layer where inorganic fine particles are dispersed is provided for a lens surface on the image side of the second lens in the first lens unit L1 and a lens surface on the image side of the second lens in the second lens unit L2.

In this embodiment, ITO is used as the inorganic fine particles and PMMA is used as the medium material for the dispersion of ITO and ITO and PMMA are mixed at a volume ratio of 20%:80% in the mixture layer GIT1 and at a volume ratio of 12%:88% in the mixture layer GIT2.

In this case, the refractive power of the mixture layer GIT1 is set to negative refractive power that is opposite to the positive refractive power of the first lens unit L1 and the refractive power of the mixture layer GIT2 is set to positive refractive power that is opposite to the negative refractive power of the second lens unit L2.

In the optical system in the fifth embodiment, during zooming from the wide angle end to the tele photo end, the lens units are moved on the optical axis so as to have loci indicated by the arrows in FIG. 9. Also, focusing is performed by moving the fourth lens unit L4.

In the optical system in the fifth embodiment, the mixture layers GIT1 and GIT2 where the fine particles are dispersed are provided on the object side with respect to the stop SP where a passage position of a paraxial chief ray becomes relatively high with respect to the optical axis. Also, negative refractive power is given to the mixture layer GIT1 provided for the first lens unit L1 having positive refractive power and positive refractive power is given to the mixture layer GIT2 provided for the second lens unit L2 having negative refractive power. With this construction, the axial chromatic aberration and the chromatic aberration of magnification are favorably corrected.

The sixth embodiment shown in FIG. 11 is a zoom lens having a four-unit construction where a first lens unit L1 having positive refractive power (optical power), a second lens unit L2 having negative refractive power, a third lens unit L3 having positive refractive power, and a fourth lens unit L4 having positive refractive power are arranged in order from the object side. This embodiment is an example in which a mixture layer where inorganic fine particles are dispersed is provided for a lens surface on the image side of the first lens in the third lens unit L3. In this embodiment, ITO is used as the inorganic fine particles and PMMA is used as the medium material for dispersion of the ITO, with ITO and PMMA being mixed at a volume ratio of 15%:85%. Also, the refractive power of the mixture layer GIT is set to negative refractive power that is opposite to the positive refractive power of the third lens unit L3.

In the optical system in the sixth embodiment, during zooming from the wide angle end to the tele photo end, the lens units are moved as indicated by the arrows in FIG. 11. Also, focusing is performed by moving the fourth lens unit L4.

The optical action of each lens unit is fundamentally the same as that in the fifth embodiment. The axial chromatic aberration and the chromatic aberration of magnification are favorably corrected by providing the mixture layer GIT where the inorganic fine particles are dispersed on the image side with respect to the stop SP where a passage position of a paraxial chief ray becomes relatively high with respect to the optical axis and by giving negative refractive power to the mixture layer GIT provided for the third lens unit L3 having positive refractive power.

In each embodiment, by adopting the lens construction described above, an optical system is achieved which has high optical performance.

Also, in each embodiment, in order to achieve an optical system in which a material where inorganic fine particles of ITO or the like are dispersed is used, various aberrations (in particular, chromatic aberrations) are favorably corrected, and miniaturization and high optical performance are realized, it is sufficient that at least one of the following conditional expressions is satisfied.

When the optical system in each embodiment is a zoom lens, it is sufficient that the following expression is satisfied, $$0 \leq |MI/fi| < 5 \tag{4}$$

where MI represents an amount of movement of the lens unit having the refractive optical system portion GIT during zooming and fi represents the focal length of the lens unit having the refractive optical system portion GIT.

It should be noted here that the "lens unit having the refractive optical system portion GIT" corresponds to the sixth lens unit L6 in the first embodiment, to the first lens unit L1 in the second embodiment, to the fourth lens unit L4 in the third embodiment, to the third lens unit L3 in the fourth embodiment, to the first lens unit L1 and the second lens unit L2 in the fifth embodiment, and to the third lens unit L3 in the sixth embodiment.

The conditional expression (4) given above is set in the case where the lens unit having the refractive optical system portion GIT is moved or fixed during zooming in each embodiment.

The conditional expression (4) given above relates to the moving amount MI of the lens unit having the refractive optical system portion GIT during zooming and the focal length fi of the lens unit having the refractive optical system portion GIT. When the absolute value of MI/fi is greater than the upper limit of the conditional expression (4), the refractive power of the lens unit having the refractive optical system portion GIT becomes too weak and the moving amount of the lens unit having the refractive optical system portion GIT is increased, which is not preferable because miniaturization of the optical system becomes difficult to realize. In addition, in order to realize the miniaturization of the optical system, it is preferable that the numerical value range of the conditional expression (4) be set as follows, $$0.0 \leq |MI/fi| < 2.5 \tag{4a}$$

Also, in each embodiment, in order to favorably correct the various aberrations, in particular, the chromatic aberrations, it is preferable that the following expression be satisfied, $$3 < |fIT/fi| < 100 \tag{5},$$

where fIT represents the focal length of the refractive optical system portion GIT and fi represents the focal length of the lens unit having the refractive optical system portion GIT. The conditional expression (5) given above relates to the focal length fIT of the refractive optical system portion GIT and the focal length fi of the lens unit having the refractive optical system portion GIT. When the absolute value of MI/fi is less than the lower limit of the conditional expression (5) so that the refractive power of the refractive optical system portion GIT becomes too strong, correction of the secondary spectrum of the (axial) chromatic aberration becomes excessive, which is not preferable. On the other hand, when it is greater than the upper limit of the conditional expression (5) so that the refractive power of the refractive optical system portion GIT becomes too weak, correction of the secondary spectrum of the (axial) chromatic aberration becomes insufficient, which is also not preferable. In addition, in order to favorably correct the chromatic aberrations of the optical system, it is preferable that the numerical value range of the conditional expression (5) is set as follows.

$$5 < |fIT/fi| < 90 \tag{5a}$$

Also, in order to favorably correct the various aberrations, in particular, the chromatic aberrations in the entire zoom range, it is preferable that the following expression be satisfied, $$5 < |fIT/\sqrt{(fw \times ft)}| < 50 \tag{6}$$

where fIT represents the focal length of the refractive optical system portion GIT, fw represents the focal length of the entire system at the wide angle end, and ft represents the focal length of the entire system at the tele photo end. The conditional expression (6) given above relates to the focal length fIT of the refractive optical system portion GIT, the focal length fw of the entire system of the optical system at a zoom position on the wide angle end, and the focal length fx of the entire system of the optical system at a zoom position on the tele photo end.

When the value is less than the lower limit of the conditional expression (6) and the refractive power of the refractive optical system portion GIT becomes too strong, as to both of the axial chromatic aberration and the chromatic aberration of magnification, a balance between the chromatic aberration generated at a general glass material and the chromatic aberration generated at the refractive optical system portion GIT is lost and the chromatic aberrations get worse, which is not preferable. On the other hand, when the value is greater than the upper limit of the conditional expression (6) and the refractive power of the refractive optical system portion GIT becomes too weak, the correction effect for the axial chromatic aberration and the chromatic aberration of magnification becomes insufficient, which is also not preferable.

In addition, in order to favorably correct the chromatic aberrations of the optical system, it is preferable that the numerical value range of the conditional expression (6) be set as follows.

$$8 < |fIT/\sqrt{(fw \times ft)}| < 45 \tag{6a}$$

Also, in order to achieve reduction of the lens entire length and correction of various aberrations (in particular, chromatic aberrations), it is preferable that the following expression be satisfied, $$0.1 < |fi/\sqrt{(fw \times ft)}| < 5.0 \tag{7}$$

where fi represents the focal length of the lens unit having the refractive optical system portion GIT, fw represents the focal length of the entire system at the zoom position on the wide angle end, and ft represents the focal length of the entire system at the zoom position on the tele photo end.

The conditional expression (7) given above relates to the focal length fi of the lens unit having the refractive optical system portion GIT, the focal length fw of the entire system of the optical system at the zoom position on the wide angle end, and the focal length ft of the entire system of the optical system at the zoom position on the tele photo end.

When the value is less than the lower limit of the conditional expression (7) and the refractive power of the lens unit having the refractive optical system portion GIT becomes too strong, chromatic aberrations occur, which is not preferable. On the other hand, when the value is greater than the upper limit of the conditional expression (7) and the refractive power of the lens unit having the refractive optical system portion GIT becomes too weak, the moving amount of the lens unit having the refractive optical system portion GIT is increased and it becomes difficult to realize the reduction of the lens entire length, which is also not preferable. In addition, in order to achieve the reduction of the lens entire length and the correction of the chromatic aberrations, it is preferable that the numerical value range of the conditional expression (7) be set as follows.

$$0.3 < |fi/\sqrt{(fw \times ft)}| < 3.0 \tag{7a}$$

As described above, in each embodiment, by using the material, where the inorganic fine particles of ITO or the like are dispersed, having refractive power with a sign that is appropriate to an appropriate position, an optical system is realized in which the various aberrations, in particular, the chromatic aberrations are sufficiently corrected and the lens entire length is shortened.

Hereinafter, concrete numerical value data in first to sixth numerical embodiments corresponding to the first to sixth embodiments will be described. In each numerical embodiment, i represents the order counted from the object side (enlargement conjugate side), ri the radius of curvature of the i-th optical surface (i-th surface), di an axial interval between the i-th surface and the (i+1)-th surface, and ni and vi respectively the refractive index and the Abbe number of the material of the i-th optical member with respect to d-line. Also, f represents a focal length, Fno indicates an F-number, and ω represents a half angle of view.

Also, an aspherical surface shape is expressed by the following expression, $$x(h) = \frac{(1/r)h^2}{1+\sqrt{\{1-(1+k)(h/r)^2\}}} + bh^4 + ch^6 + dh^8 + eh^{10} \ldots$$
$$+ a'h^3 + b'h^5 + c'h^7 + d'h^9 + \ldots ,$$

where X represents a displacement amount from a surface vertex in an optical axis direction, h represents a height from an optical axis in a direction vertical to the optical axis, r represents a paraxial radius of curvature, k represents a conic constant, and b, c, d, e, . . . and a', b', c', . . . represent aspherical surface coefficients on respective orders.

Note that "E±XX" in each aspherical surface coefficient means "$\times 10^{\pm XX}$".

In each numerical embodiment, a mixture where ITO is dispersed in acrylic (PMMA) is used for the refractive optical system portion GIT. The refractive index of the mixture of ITO and acrylic is calculated from a value obtained using the expression (i) described above.

Numerical Embodiment 1

| f = 28.8 to 34.4 | FNo = 1:1.8 to 2.1 | 2ω = 46.9° to 39.9° | |
|---|---|---|---|
| r1 = 479.991 | d1 = 2.39 | n1 = 1.77534 | ν1 = 50.2 |
| r2 = −174.256 | d2 = 0.15 | | |
| r3 = 113.827 | d3 = 1.50 | n2 = 1.78000 | ν2 = 50.0 |
| r4 = 28.536 | d4 = 4.08 | | |
| r5 = −142.555 | d5 = 1.50 | n3 = 1.83417 | ν3 = 37.0 |
| r6 = 54.349 | d6 = variable | | |
| r7 = 250.553 | d7 = 3.40 | n4 = 1.77562 | ν4 = 50.2 |
| r8 = −52.927 | d8 = 0.29 | | |
| r9 = 36.084 | d9 = 1.50 | n5 = 1.48700 | ν5 = 70.4 |
| r10 = 17.823 | d10 = 4.71 | n6 = 1.73822 | ν6 = 39.4 |
| r11 = 71.782 | d11 = variable | | |
| r12 = ∞ | d12 = 0.00 | | |
| r13 = 47.077 | d13 = 2.43 | n7 = 1.49198 | ν7 = 69.8 |
| r14 = −259.854 (stop) | d14 = variable | | |
| r15 = −83.027 | d15 = 1.50 | n8 = 1.54337 | ν8 = 65.1 |
| r16 = 36.053 | d16 = variable | | |
| r17 = −13.389 | d17 = 1.50 | n9 = 1.85000 | ν9 = 23.0 |
| r18 = −47.648 | d18 = 4.77 | n10 = 1.76938 | ν10 = 50.5 |
| r19 = −18.838 | d19 = 0.15 | | |
| r20 = −345.897 | d20 = 4.40 | n11 = 1.78000 | ν11 = 50.0 |
| r21 = −37.216 | d21 = variable | | |
| r22 = 84.335 (Aspherical surface) | d22 = 0.01 | n12 = 1.57160 | ν12 = 13.5 |
| r23 = 66.832 | d23 = 4.81 | n13 = 1.78000 | ν13 = 50.0 |
| r24 = −96.327 | d24 = 1.82 | | |
| r25 = ∞ | d25 = 41.50 | n14 = 1.62299 | ν14 = 58.2 |
| r26 = ∞ | d26 = 2.60 | n15 = 1.51633 | ν15 = 64.1 |
| r27 = ∞ | | | |

| Focal Length | 28.82 | 31.32 | 34.44 |
|---|---|---|---|
| Variable Interval | | | |
| d6 | 4.27 | 3.07 | 1.75 |
| d11 | 11.15 | 10.85 | 8.44 |
| d14 | 1.85 | 4.76 | 8.77 |
| d16 | 11.74 | 8.55 | 6.00 |
| d21 | 0.50 | 2.29 | 4.55 |

| Aspherical surface coefficient 22nd Surface | | |
|---|---|---|
| k | b | c |
| −7.027492e+00 | −1.183492e−06 | 2.606798e−10 |
| d | | e |
| −5.197561e−12 | | 6.728677e−15 |

Numerical Embodiment 2

| f = 28.8 to 34.4 | FNo = 1:1.8 to 2.0 | 2ω = 46.9° to 39.9° | |
|---|---|---|---|
| r1 = −1000.000 | d1 = 3.12 | n1 = 1.77583 | ν1 = 44.6 |
| r2 = −75.204 | d2 = 0.30 | n2 = 1.57160 | ν2 = 13.5 |
| r3 = −52.577 (Aspherical Surface) | d3 = 0.15 | | |
| r4 = 95.547 | d4 = 1.50 | n3 = 1.72355 | ν3 = 52.7 |
| r5 = 22.798 | d5 = 5.43 | | |
| r6 = −47.470 | d6 = 1.50 | n4 = 1.83007 | ν4 = 37.9 |
| r7 = 143.093 | d7 = variable | | |
| r8 = −466.401 | d8 = 2.77 | n5 = 1.82288 | ν5 = 39.2 |
| r9 = −49.985 | d9 = 0.15 | | |
| r10 = 32.665 | d10 = 1.50 | n6 = 1.48700 | ν6 = 70.4 |
| r11 = 22.659 | d11 = 3.20 | n7 = 1.83364 | ν7 = 34.0 |
| r12 = 53.494 | d12 = variable | | |
| r13 = 25.138 | d13 = 3.72 | n8 = 1.48700 | ν8 = 70.4 |
| r14 = −177.500 | d14 = variable | | |
| r15 = (Stop) | d15 = 2.04 | | |
| r16 = 104.736 | d16 = 1.50 | n9 = 1.66301 | ν9 = 30.9 |
| r17 = 19.977 | d17 = variable | | |
| r18 = −13.506 | d18 = 1.50 | n10 = 1.79814 | ν10 = 28.5 |
| r19 = 82.460 | d19 = 6.03 | n11 = 1.59085 | ν11 = 61.9 |
| r20 = −19.280 | d20 = 0.52 | | |
| r21 = −2066.276 | d21 = 5.05 | n12 = 1.78000 | ν12 = 50.0 |
| r22 = −32.904 | d22 = variable | | |
| r23 = 66.123 | d23 = 4.50 | n13 = 1.80841 | ν13 = 42.1 |
| r24 = −132.913 | d24 = 1.82 | | |
| r25 = ∞ | d25 = 41.50 | n14 = 1.62299 | ν14 = 58.2 |
| r26 = ∞ | d26 = 2.60 | n15 = 1.51633 | ν15 = 64.1 |
| r27 = ∞ | | | |

| Focal Length | 28.82 | 31.27 | 34.43 |
|---|---|---|---|
| Variable Interval | | | |
| d7 | 4.86 | 3.37 | 1.87 |
| d12 | 8.34 | 5.82 | 2.50 |
| d14 | 1.85 | 3.68 | 5.80 |
| d17 | 8.57 | 8.38 | 7.95 |
| d22 | 0.50 | 2.87 | 6.00 |

| Aspherical Surface Coefficient 3rd surface | | |
|---|---|---|
| k | b | c |
| −8.785724e+00 | 1.117266e−06 | 2.767939e−09 |
| d | | e |
| −1.361241e−11 | | 2.009707e−14 |

Numerical Embodiment 3

| f = 7.5 to 38.5 | FNo = 1:4.1 | 2ω = 102.0° to 58.7° | |
|---|---|---|---|
| r1 = 1381.812 (Aspherical Surface) | d1 = 3.50 | n1 = 1.58313 | ν1 = 59.4 |
| r2 = 20.079 | d2 = variable | | |
| r3 = −119.765 | d3 = 1.30 | n2 = 1.77250 | ν2 = 49.6 |
| r4 = 26.434 (Aspherical Surface) | d4 = 1.32 | | |
| r5 = 23.868 | d5 = 4.35 | n3 = 1.84666 | ν3 = 23.9 |
| r6 = 50.526 | d6 = variable | | |
| r7 = 0.000 | d7 = 0.50 | | |
| r8 = 36.740 | d8 = 1.20 | n4 = 1.84666 | ν4 = 23.9 |
| r9 = 20.162 | d9 = 4.99 | n5 = 1.51633 | ν5 = 64.1 |
| r10 = −54.769 | d10 = 0.15 | | |
| r11 = 33.954 | d11 = 3.19 | n6 = 1.67790 | ν6 = 55.3 |

-continued

Numerical Embodiment 3

| | | | |
|---|---|---|---|
| r12 = −122.644 | d12 = variable | | |
| r13 = (Stop) | d13 = 1.50 | | |
| r14 = −50.807 | d14 = 1.00 | n7 = 1.86300 | ν7 = 41.5 |
| r15 = 51.180 | d15 = 0.67 | | |
| r16 = 161.213 | d16 = 1.00 | n8 = 1.72342 | ν8 = 38.0 |
| r17 = 17.174 | d17 = 3.49 | n9 = 1.80518 | ν9 = 25.4 |
| r18 = −4559.135 | d18 = variable | | |
| r19 = 55.808 | d19 = 5.68 | n10 = 1.48749 | ν10 = 70.2 |
| r20 = −25.763 | d20 = 0.50 | n11 = 1.57159 | ν11 = 13.5 |
| r21 = −30.372 (Aspherical Surface) | d21 = 0.15 | | |
| r22 = 134.832 | d22 = 1.20 | n12 = 1.83400 | ν12 = 37.2 |
| r23 = 18.611 | d23 = 6.95 | n13 = 1.48749 | ν13 = 70.2 |
| r24 = −56.393 | | | |

| Focal Length | 17.51 | 28.00 | 38.50 |
|---|---|---|---|

Variable Interval

| | | | |
|---|---|---|---|
| d2 | 13.74 | 13.74 | 13.74 |
| d6 | 24.65 | 11.15 | 5.55 |
| d12 | 1.01 | 6.28 | 10.73 |
| d18 | 10.95 | 5.68 | 1.22 |

Aspherical Surface Coefficient
1st Surface

| b | c | d | e |
|---|---|---|---|
| 1.541946e−05 | −1.703973e−08 | 1.550544e−11 | −3.917946e−15 |

4th Surface

| b | c | d |
|---|---|---|
| 1.588787e−05 | −1.398091e−08 | 7.979067e−11 |

21st Surface

| b | c | d | e |
|---|---|---|---|
| 8.893654e−06 | 4.019287e−08 | −2.818461e−10 | 7.971370e−13 |

Numerical Embodiment 4 f = 22.9 to 52.9    FNo = 1:3.9 to 5.9    2ω = 86.8° to 44.5°

| | | | |
|---|---|---|---|
| r1 = 36.615 | d1 = 1.44 | n1 = 1.80610 | ν1 = 40.9 |
| r2 = 15.544 | d2 = 0.54 | n2 = 1.59629 | ν2 = 13.9 |
| r3 = 16.027 | d3 = 7.39 | | |
| r4 = 165.372 | d4 = 1.20 | n3 = 1.71999 | ν3 = 50.2 |
| r5 = 21.580 | d5 = 0.09 | n4 = 1.51282 | ν4 = 50.9 |
| r6 = 18.642 (Aspherical Surface) | d6 = 2.62 | | |
| r7 = 24.450 | d7 = 4.30 | n5 = 1.74077 | ν5 = 27.8 |
| r8 = 152.272 | d8 = Variable | | |
| r9 = 25.619 | d9 = 2.60 | n6 = 1.51742 | ν6 = 52.4 |
| r10 = −62.378 | d10 = 0.60 | | |
| r11 = (Stop) | d11 = 0.60 | | |
| r12 = 20.136 | d12 = 3.50 | n7 = 1.51742 | ν7 = 52.4 |
| r13 = −177.115 | d13 = 0.43 | | |
| r14 = −37.539 | d14 = 7.50 | n8 = 1.72825 | ν8 = 28.5 |
| r15 = 17.433 | d15 = 1.93 | | |
| r16 = 58.669 | d16 = 2.50 | n9 = 1.57099 | ν9 = 50.8 |
| r17 = −21.352 | d17 = Variable | | |
| r18 = ∞ | d18 = Variable | | |
| r19 = −36.137 | d19 = 1.00 | n10 = 1.71999 | ν10 = 50.2 |
| r20 = 70.937 | d20 = 0.63 | | |
| r21 = 236.020 | d21 = 3.40 | n11 = 1.71300 | ν11 = 53.9 |
| r22 = −29.793 | | | |

-continued

Numerical Embodiment 4

| Focal Length | 22.90 | 35.05 | 52.88 |
|---|---|---|---|

Variable Interval

| | | | |
|---|---|---|---|
| d8 | 26.27 | 10.86 | 1.07 |
| d17 | 0.00 | 4.13 | 10.20 |
| d18 | 1.80 | 7.88 | 16.80 |

Aspherical Surface Coefficient
6th Surface

| b | c | d | e |
|---|---|---|---|
| −2.238197e−05 | −1.062584e−07 | 3.098938e−10 | −1.455066e−12 |

Numerical Embodiment 5 f = 5.88 to 56.58    Fno = 1:2.88 to 3.12    2ω = 58.9° to 6.7°

| | | | |
|---|---|---|---|
| r1 = 46.879 | d1 = 1.20 | n1 = 1.84666 | ν1 = 23.9 |
| r2 = 27.037 | d2 = 3.90 | n2 = 1.48749 | ν2 = 70.2 |
| r3 = −201.382 | d3 = 0.05 | n3 = 1.56987 | ν3 = 13.3 |
| r4 = −386.050 | d4 = 0.20 | | |
| r5 = 25.348 | d5 = 2.70 | n4 = 1.77250 | ν4 = 49.6 |
| r6 = 78.149 | d6 = Variable | | |
| r7 = 45.184 | d7 = 0.70 | n5 = 1.83481 | ν5 = 42.7 |
| r8 = 6.666 | d8 = 3.07 | | |
| r9 = −23.096 | d9 = 0.60 | n6 = 1.77250 | ν6 = 49.6 |
| r10 = 23.096 | d10 = 0.05 | n7 = 1.53019 | ν7 = 24.1 |
| r11 = 32.706 | d11 = 0.70 | | |
| r12 = 15.004 | d12 = 1.80 | n8 = 1.92286 | ν8 = 18.9 |
| r13 = 56.593 | d13 = Variable | | |
| r14 = Stop | d14 = Variable | | |
| r15 = 9.215 | d15 = 2.60 | n9 = 1.58313 | ν9 = 59.4 |
| r16 = −4250.027 | d16 = 2.16 | | |
| r17 = 14.073 | d17 = 0.60 | n10 = 1.84666 | ν10 = 23.9 |
| r18 = 8.060 | d18 = 0.82 | | |
| r19 = 30.141 | d19 = 1.40 | n11 = 1.48749 | ν11 = 70.2 |
| r20 = −50.234 | d20 = Variable | | |
| r21 = ∞ | d21 = Variable | | |
| r22 = 18.116 | d22 = 2.30 | n12 = 1.69680 | ν12 = 55.5 |
| r23 = −19.993 | d23 = 0.60 | n13 = 1.84666 | ν13 = 23.9 |
| r24 = −88.468 | d24 = 2.20 | | |
| r25 = ∞ | d25 = 2.20 | n14 = 1.51633 | ν14 = 64.1 |
| r26 = ∞ | | | |

| Focal Length | 5.88 | 28.88 | 56.58 |
|---|---|---|---|

Variable Interval

| | | | |
|---|---|---|---|
| d6 | 0.80 | 17.56 | 22.79 |
| d13 | 24.68 | 5.78 | 1.99 |
| d21 | 5.53 | 4.27 | 9.03 |

Aspherical Surface Coefficient
15th Surface

| k | b | c |
|---|---|---|
| −3.69419e−01 | −5.66270e−05 | 1.49315e−05 |

| d | e |
|---|---|
| −9.82351e−08 | 4.33129e−11 |

| a' | b' | c' |
|---|---|---|
| −8.96331e−05 | −7.26737e−05 | −1.01524e−06 |

Numerical Embodiment 6 f = 5.88 to 56.58   Fno = 1:2.88 to 3.12   2ω = 58.9° to 6.7°

| | | | |
|---|---|---|---|
| r1 = 47.713 | d1 = 1.20 | n1 = 1.84666 | ν1 = 23.9 |
| r2 = 26.905 | d2 = 3.95 | n2 = 1.49700 | ν2 = 81.5 |
| r3 = −756.011 | d3 = 0.20 | | |
| r4 = 25.921 | d4 = 2.70 | n3 = 1.77250 | ν3 = 49.6 |
| r5 = 84.035 | d5 = Variable | | |
| r6 = 45.783 | d6 = 0.70 | n4 = 1.83481 | ν4 = 42.7 |
| r7 = 6.814 | d7 = 3.16 | | |
| r8 = −24.259 | d8 = 0.60 | n5 = 1.77250 | ν5 = 49.6 |
| r9 = 24.259 | d9 = 0.75 | | |
| r10 = 15.131 | d10 = 1.80 | n6 = 1.92286 | ν6 = 18.9 |
| r11 = 71.271 | d11 = Variable | | |
| r12 = Stop | d12 = Variable | | |
| r13 = 9.279 | d13 = 2.60 | n7 = 1.58313 | ν7 = 59.4 |
| r14 = −122.555 | d14 = 0.05 | n8 = 1.55200 | ν8 = 16.15 |
| r15 = −2581.660 | d15 = 2.11 | | |
| r16 = 15.128 | d16 = 0.60 | n9 = 1.76182 | ν9 = 26.5 |
| r17 = 8.096 | d17 = 0.82 | | |
| r18 = 42.115 | d18 = 1.40 | n10 = 1.48749 | ν10 = 70.2 |
| r19 = −46.832 | d19 = Variable | | |
| r20 = ∞ | d20 = Variable | | |
| r21 = 18.203 | d21 = 2.30 | n11 = 1.69680 | ν11 = 55.5 |
| r22 = −16.179 | d22 = 0.60 | n12 = 1.84666 | ν12 = 23.9 |
| r23 = −58.746 | d23 = 2.20 | | |
| r24 = ∞ | d24 = 2.20 | n13 = 1.51633 | ν13 = 64.1 |
| r25 = ∞ | | | |

| Focal Length | 5.88 | 28.88 | 56.58 |
|---|---|---|---|

Variable Interval

| | | | |
|---|---|---|---|
| d5 | 0.80 | 17.93 | 23.34 |
| d12 | 24.86 | 5.78 | 1.96 |
| d20 | 5.47 | 4.43 | 8.99 |

Aspherical Surface Coefficient
13th Surface

| k | b | c |
|---|---|---|
| 1.28803e−01 | −1.93601e−05 | 3.49815e−05 |

| d | e |
|---|---|
| 5.87516e−07 | −2.86137e−09 |

| a' | b' | c' |
|---|---|---|
| −6.69157e−05 | −9.71904e−05 | −6.90202e−06 |

Also, values of the conditional expressions in each numerical embodiment are given below.

| Conditional Expression | Example 1 | Example 2 | Example 3 | Example 4 | Example 5 | Example 6 |
|---|---|---|---|---|---|---|
| (1) | 13.51443 | 13.51443 | 13.51618 | 13.87058 | 13.51618 | 16.14581 |
| (2) | 0.97032 | 0.97032 | 0.97034 | 0.97594 | 0.97034 | 0.99078 |
| (3) | 0.34300 | 0.34300 | 0.34301 | 0.34586 | 0.34301 | 0.35843 |
| (4) | 0.00000 | 0.00000 | 0.37870 | 0.00021 | 2.36027 | 0.14458 |
| (5) | 9.86336 | 10.52181 | 6.12201 | 19.70783 | 88.27694 | 11.23328 |
| (6) | 17.56209 | 9.48335 | 11.90921 | 17.49017 | 13.51618 | 16.14581 |
| (7) | 1.78054 | 0.90130 | 1.94531 | 0.88747 | 2.06410 | 1.13763 |

FIG. 16 is a main portion schematic diagram of an embodiment where the optical system according to the present invention is applied to a reflection-type liquid crystal projector (image projection apparatus).

A light beam emitted from an illumination unit 101 is reflected by a beam splitter 102 and is incident on and reflected by a reflection-type liquid crystal display panel 103. The light beam modulated by the liquid crystal display panel 103 passes through the beam splitter 102 and is incident on a projection unit 104 formed by the optical system according to the present invention. The projection unit 104 projects image information based on the liquid crystal display panel 103 onto a screen 105.

It should be noted here that in this embodiment, a transmission-type liquid crystal display panel may be used as the liquid crystal panel 103.

FIG. 17 is a main portion schematic view of an embodiment where the optical system according to the present invention is applied to an image pickup apparatus. In this embodiment, an example will be described in which the optical system according to the present invention is applied to an image pickup apparatus, such as a video camera, a film camera, or a digital camera, as a photographing lens. In FIG. 17, a photographing lens 8 forms an image of an object 9 on a photosensitive member 7. The photosensitive member 7 is a silver-halide film or a photoelectric transducer, such as a CCD image sensor or a CMOS image sensor, and obtains image information in the form of a latent image or an electric signal from the object image formed by the photographing lens 8.

This application claims priority from Japanese Patent Application No. 2004-134577 filed Apr. 28, 2004, which is hereby incorporated by reference herein.

What is claimed is:

1. An optical system comprising:
   a plurality of lens units,
   wherein at least one of the plurality of lens units includes a refractive optical element made of a solid material that satisfies the following conditions:

$3 < \nu d < 30$ $0.10 < \theta gd < 1.25$ $0.10 < \theta gF < 0.60$ where νd is an Abbe number of the solid material and θgd and θgF represent partial dispersion ratios of the solid material, and
   wherein the refractive optical element has refractive power with a sign opposite to a sign of refractive power of the lens unit including the refractive optical element.

2. An optical system according to claim 1,
wherein the optical system satisfies the following condition:

$$3 < |fIT/fi| < 100$$

where fIT is a focal length of the refractive optical element and fi is a focal length of the lens unit including the refractive optical element.

3. An optical system according to claim 1,
wherein the optical system is a zoom lens system and satisfies the following condition:

$$0 \leq |MI/fi| < 5$$

where MI is an amount of movement of the lens unit including the refractive optical element during zooming from wide angle end to tele photo end and fi is a focal length of the lens unit including the refractive optical element.

4. An optical system according to claim 1,
wherein the optical system is a zoom lens system and satisfies the following condition:

$$5 < |fIT/\sqrt{(fw \times ft)}| < 50$$

where fIT is a focal length of the refractive optical element, fw is a focal length of an entire system of the optical system at wide angle end, and ft is a focal length of the entire system of the optical system at tele photo end.

5. An optical system according to claim 1,
wherein the optical system is a zoom lens system and satisfies the following condition:

$$0.10 < |fi/\sqrt{(fw \times ft)}| < 5.00$$

where fi is a focal length of the lens unit including the refractive optical element, fw is a focal length of an entire system of the optical system at wide angle end, and ft is a focal length of the entire system of the optical system at tele photo end.

6. An optical system according to claim 1,
wherein the solid material is composed of a mixture where inorganic fine particles are dispersed in a transparent medium.

7. An optical system according to claim 6,
wherein the inorganic fine particles contain at least one of indium-tin oxide, $TiO_2$, $Nb_2O_5$, $Cr_2O_3$, and $BaTiO_3$.

8. An image pickup apparatus comprising:
the optical system according to claim 1; and
a solid-state image pickup element for picking up an image formed by the optical system.

9. A projection apparatus comprising:
a display unit for forming an original image; and
the optical system according to claim 1,
wherein the original image is projected onto a screen by the optical system.

* * * * *